Figure 1:
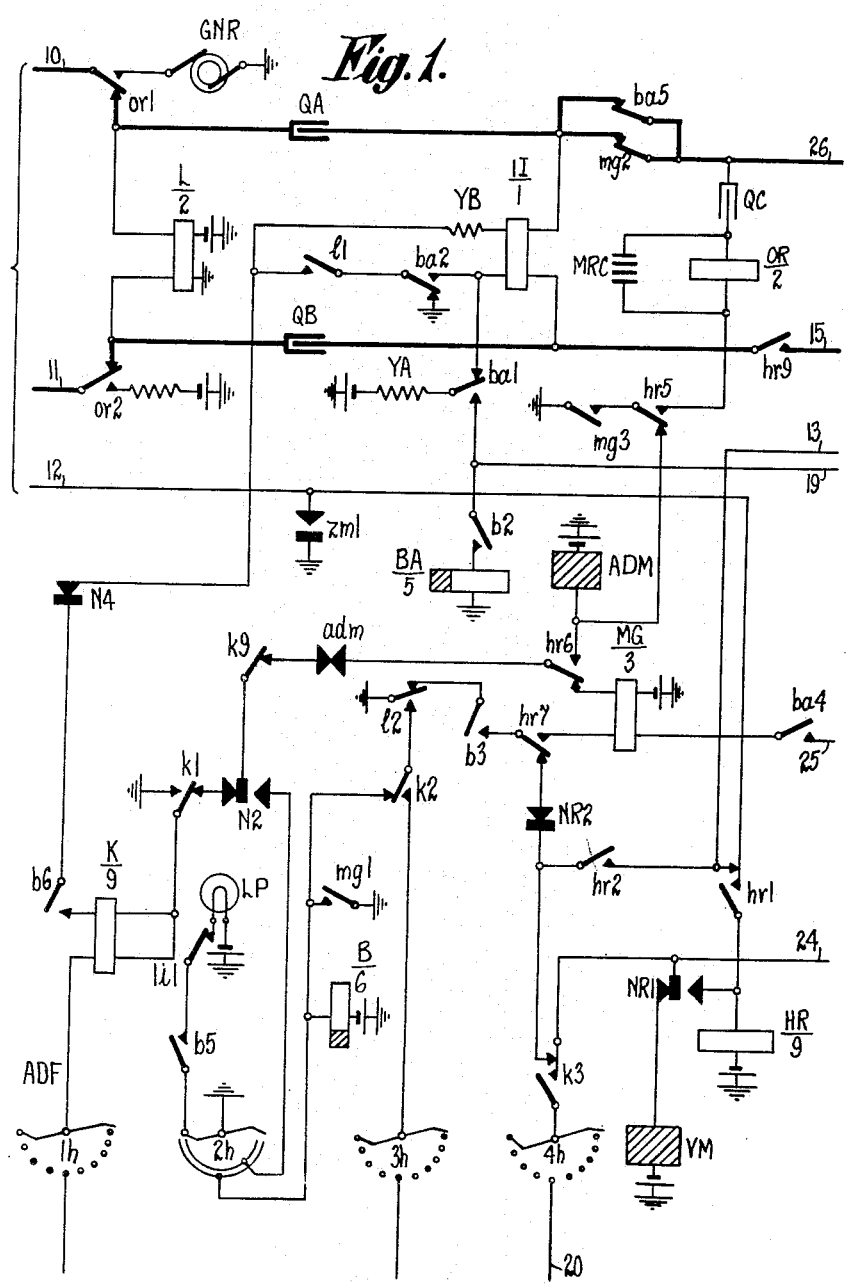
Figure 2:
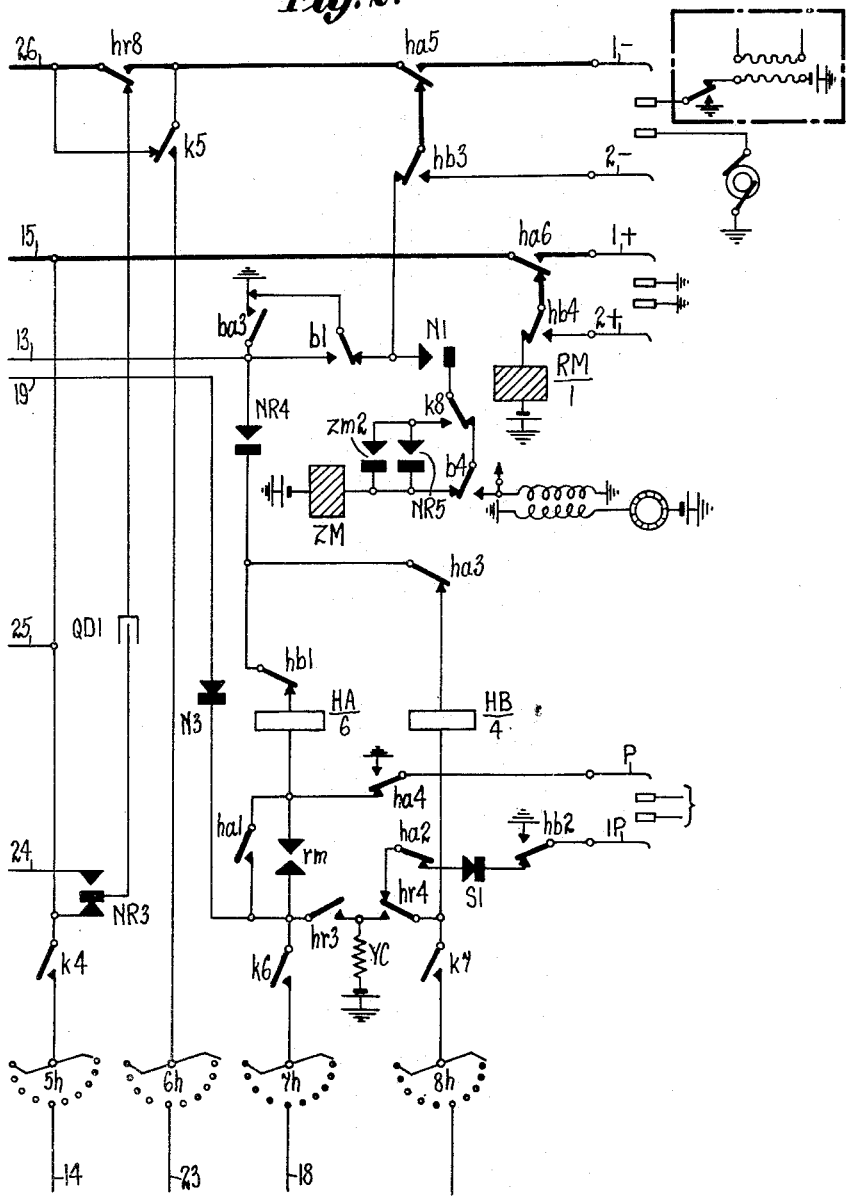

Dec. 5, 1933.  C. GILLINGS ET AL  1,938,381
TELEPHONE SYSTEM
Filed Aug. 10, 1931     19 Sheets-Sheet 1

Inventors
Charles Gillings   Francis Tatlock Belas
Charles Edmund Beale   Reginald Taylor
George Thomas Baker R B Richardson
Atty.

Dec. 5, 1933.  C. GILLINGS ET AL  1,938,381
TELEPHONE SYSTEM
Filed Aug. 10, 1931  19 Sheets-Sheet 4
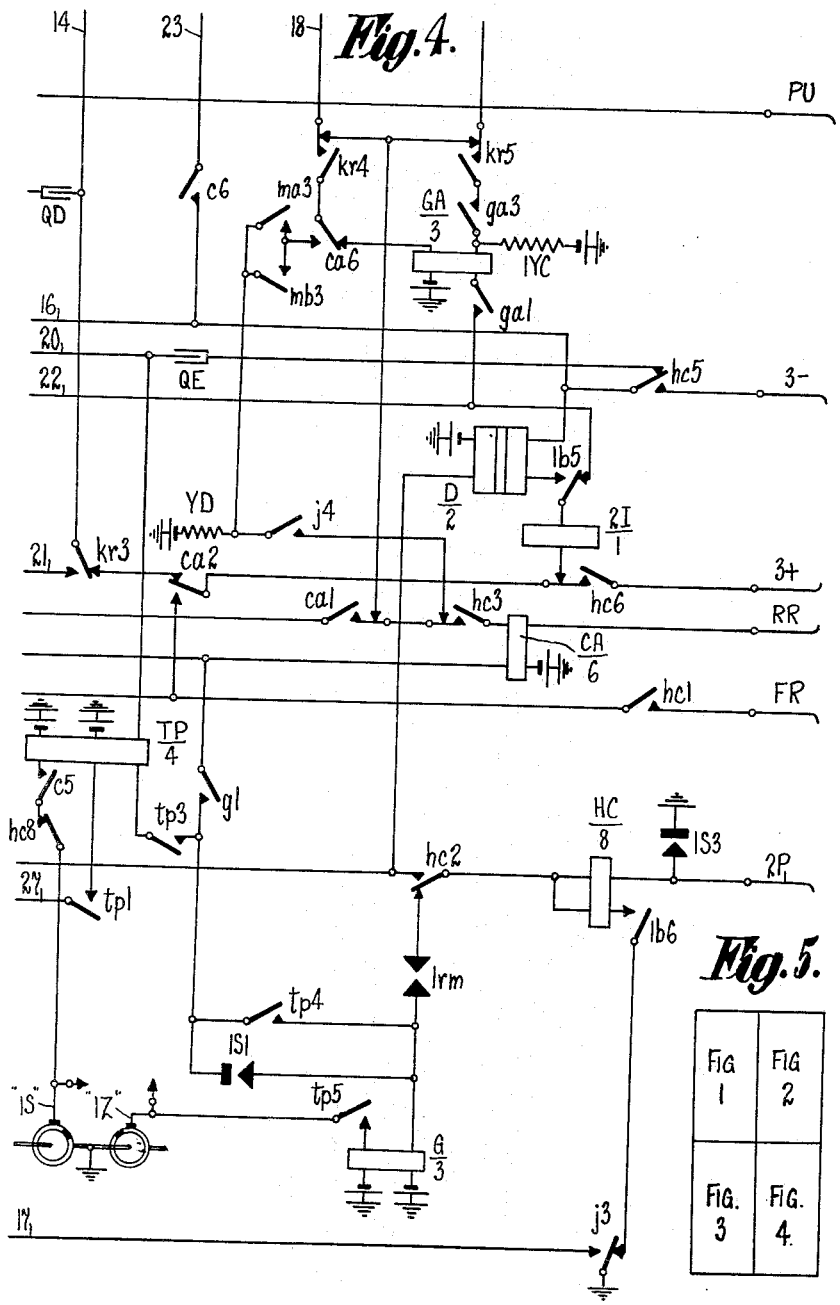
Inventors
Charles Gillings  Francis Tatlock Belas
Charles Edmund Beale  Reginald Taylor
George Thomas Baker
Atty.

Dec. 5, 1933.  C. GILLINGS ET AL  1,938,381
TELEPHONE SYSTEM
Filed Aug. 10, 1931  19 Sheets-Sheet 5

Inventors
Charles Gillings  Francis Tatlock Belas
Charles Edmund Beale  Reginald Taylor
George Thomas Baker
R S Richardson
Atty.

Fig. 10.

Fig. 12.

Dec. 5, 1933.    C. GILLINGS ET AL    1,938,381
TELEPHONE SYSTEM
Filed Aug. 10, 1931    19 Sheets-Sheet 14

Inventors
Charles Gillings  Francis Tatlock Belas
Charles Edmund Beale  Reginald Taylor
George Thomas Baker Atty.

Dec. 5, 1933.  C. GILLINGS ET AL  1,938,381
TELEPHONE SYSTEM
Filed Aug. 10, 1931  19 Sheets-Sheet 18

*Fig. 19.*

Inventors
Charles Gillings   Francis Tatlock Belas
Charles Edmund Beale   Reginald Taylor
George Thomas Baker Atty.

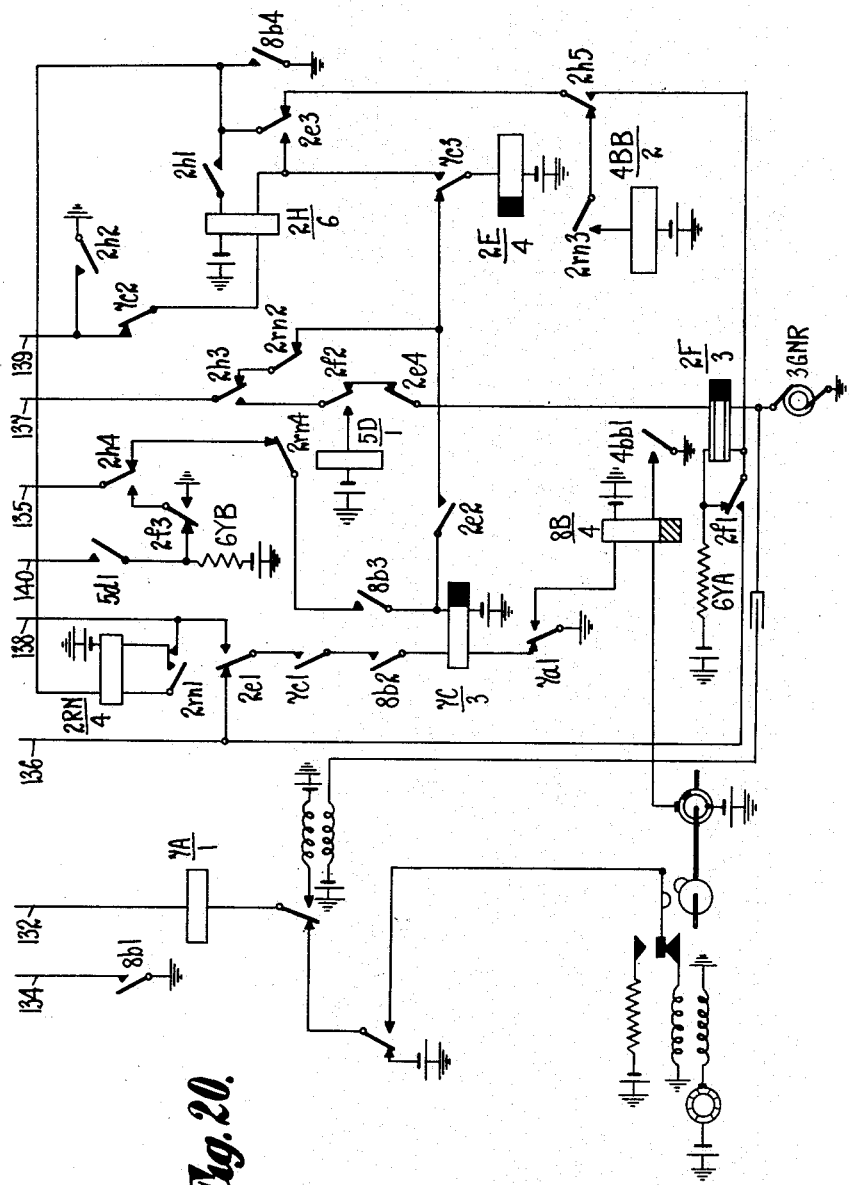

Patented Dec. 5, 1933

1,938,381

UNITED STATES PATENT OFFICE 1,938,381

TELEPHONE SYSTEM

Charles Gillings, Francis Tatlock Belas, Charles Edmund Beale, and Reginald Taylor, Liverpool, and George Thomas Baker, Caerphilly, England, assignors to Associated Telephone and Telegraph Company, Chicago, Ill., a corporation of Delaware Application August 10, 1931, Serial No. 556,164, and in Great Britain August 21, 1930

31 Claims. (Cl. 179—18)

The present invention relates to telephone systems and is more particularly concerned with systems employing register controllers for controlling the operation of automatic switches, the object of the invention is to provide such a telephone system in which the problem of alternative routing of a call is solved in a simple manner by the use of a single motion switch in the register controller which performs the function of a code translating switch. Another object of the invention is the provision of a final code selector and an "A" digit switch adapted to operate in conjunction with automatic switches arranged in groups and controlled by common apparatus. A further object of the invention relates to the provision of automatic switches adapted to operate with a register controller provided with alternative routing facilities.

In telephone systems employing register controllers it has been usual for the so-called B and C routing digits, normally the second and third letters of the exchange name, to be received on a two motion switch located in the register controller and provided with a suitable number of banks which may be cross-connected to a sender switch bank so as to effect the required code translation.

From experience it has been found that the capacity of such a switch for all ordinary circumstances is generally greatly in excess of that required and it has therefore already been suggested that economy would result from the use of a single motion switch or possibly two single two motion switches operated either together or alternatively in place of the two motion switch. With such an arrangement, however, it will be appreciated that the B and C digits cannot conveniently be received directly on the single motion switch and this switch will preferably be arranged to hunt for markings effected by other switches. Such an arrangement considerably simplifies the problems of alternative routing since it is readily possible to have the re-routing translation contacts adjacent to the regular translation contacts in the bank of the code translating switch in which case it is only necessary to advance the wipers of the switch one step to set up the re-routing code.

The invention will be better understood from the following description of one method of carrying it into effect taken in conjunction with the accompanying drawings, in which:—

Figure 11:
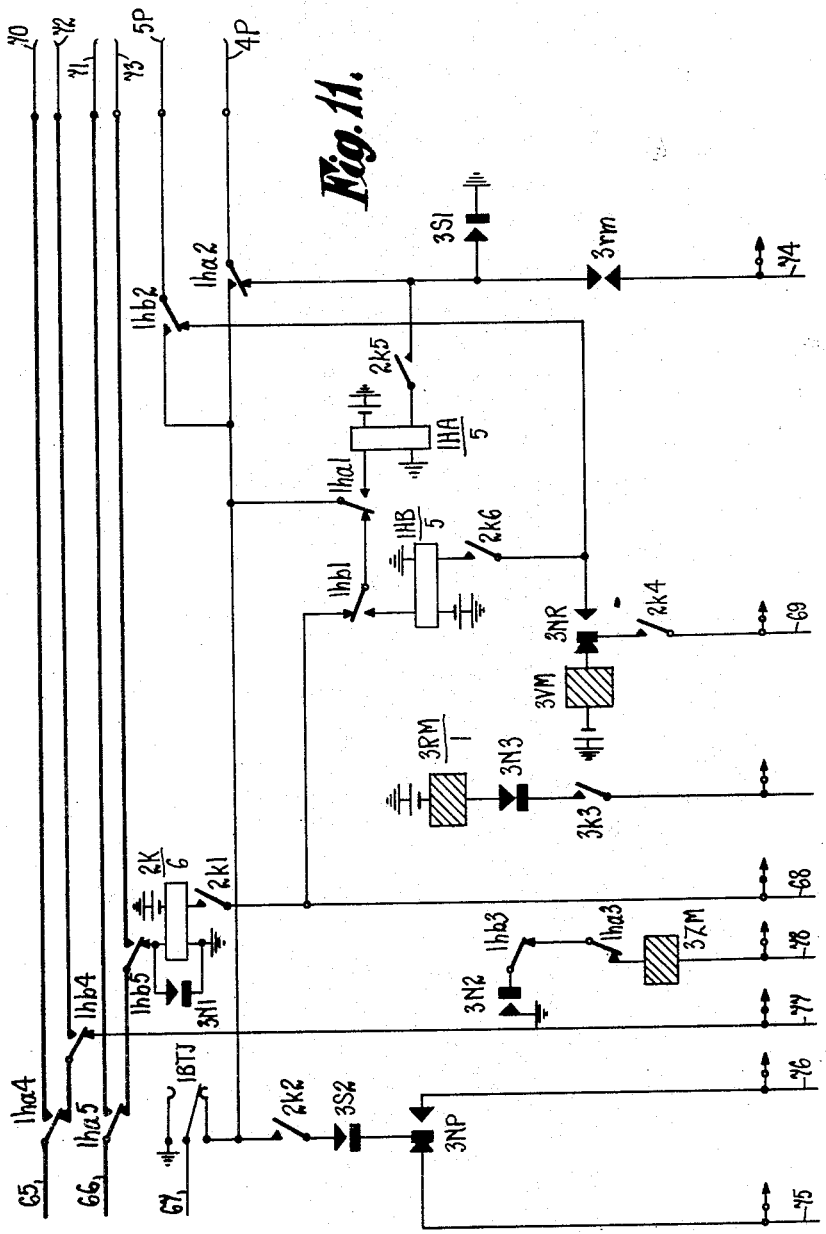
Figure 13:
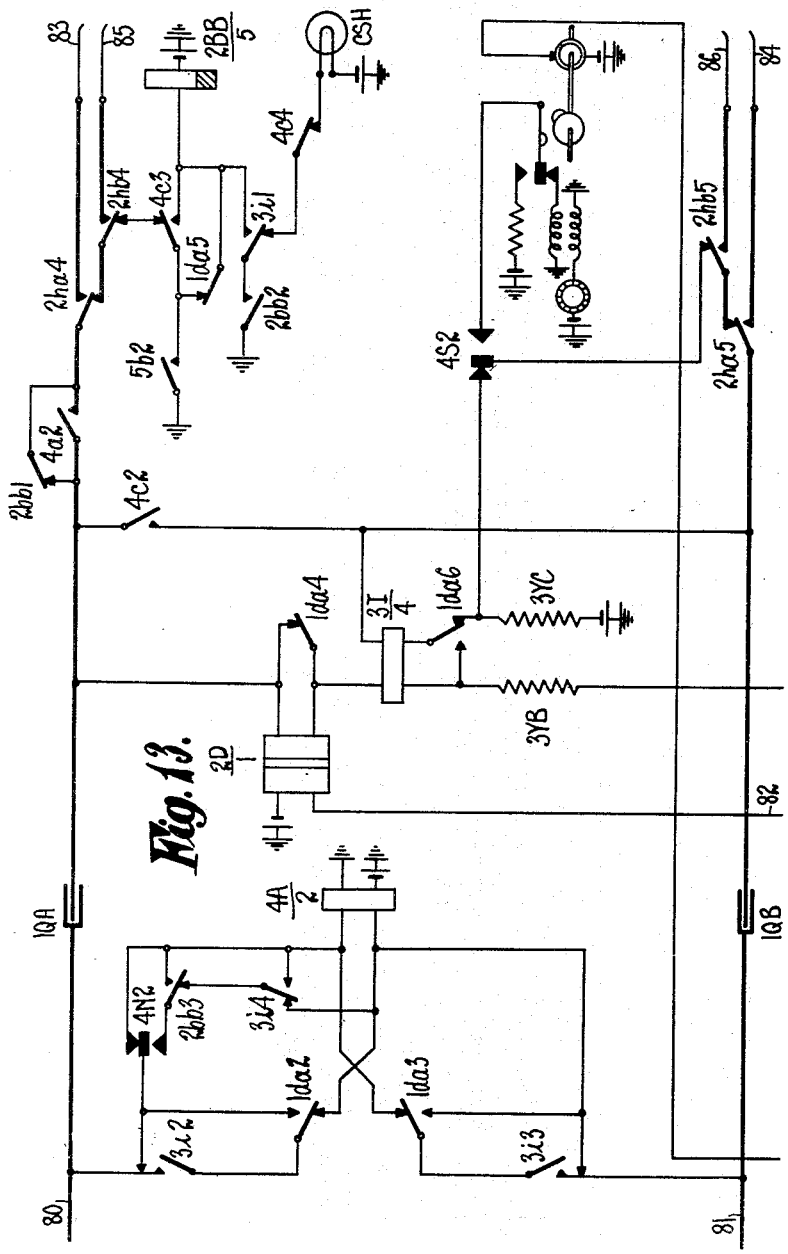
Figure 14:
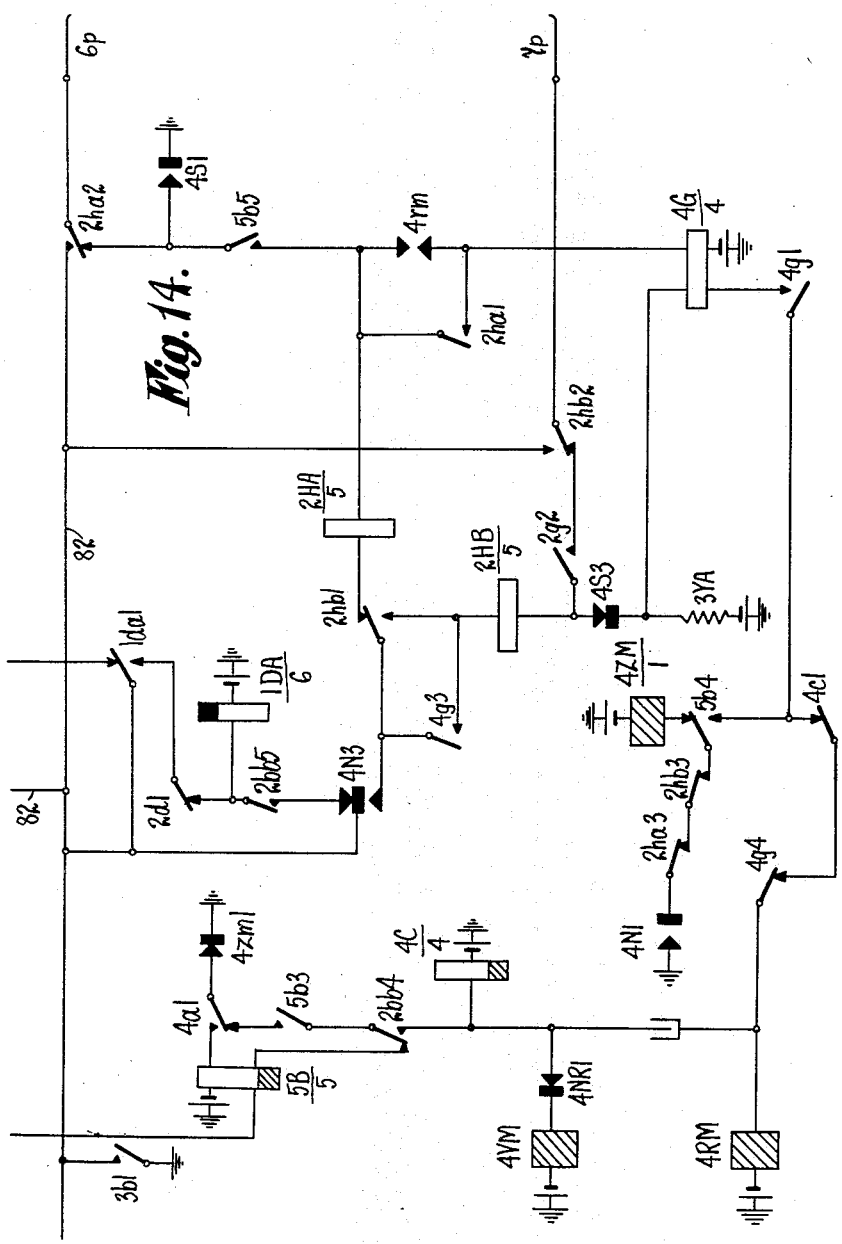
Figure 15:
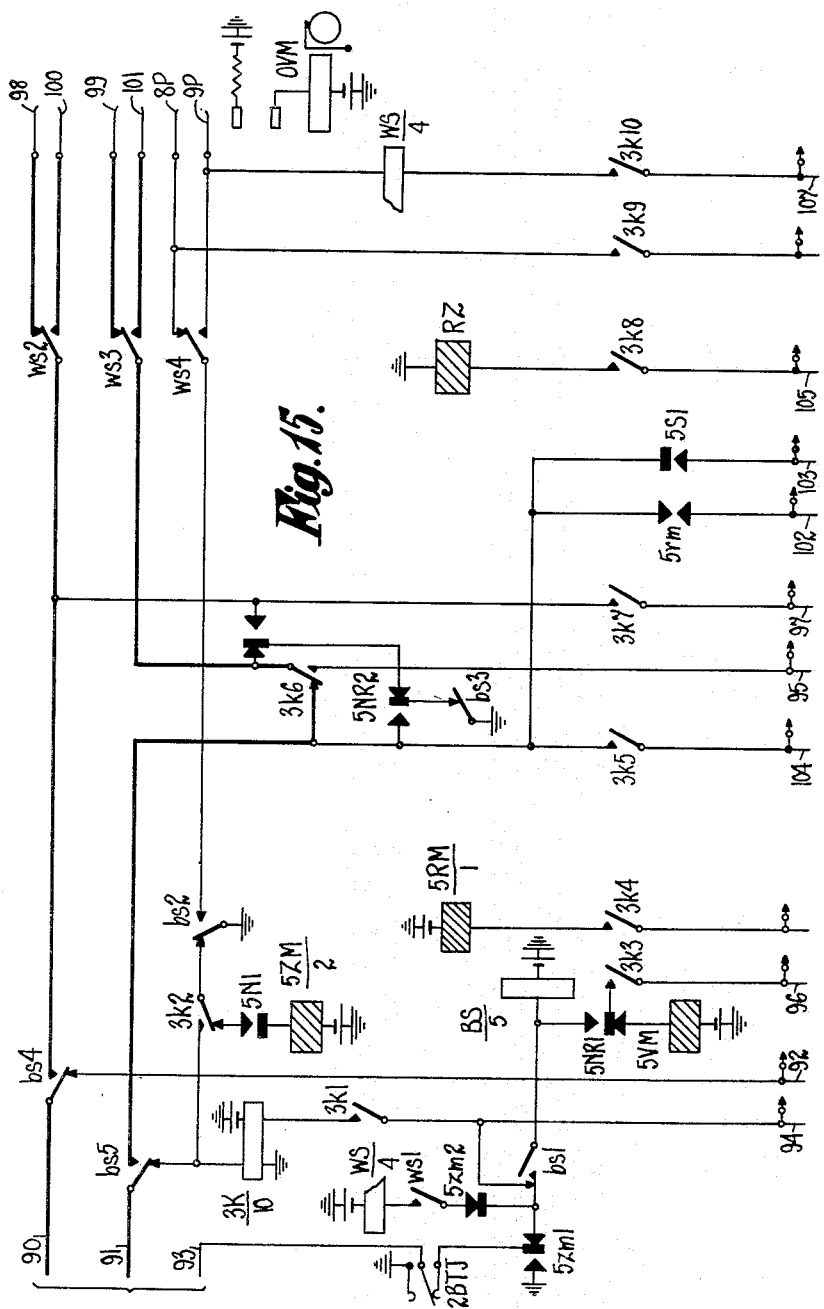
Figure 16:
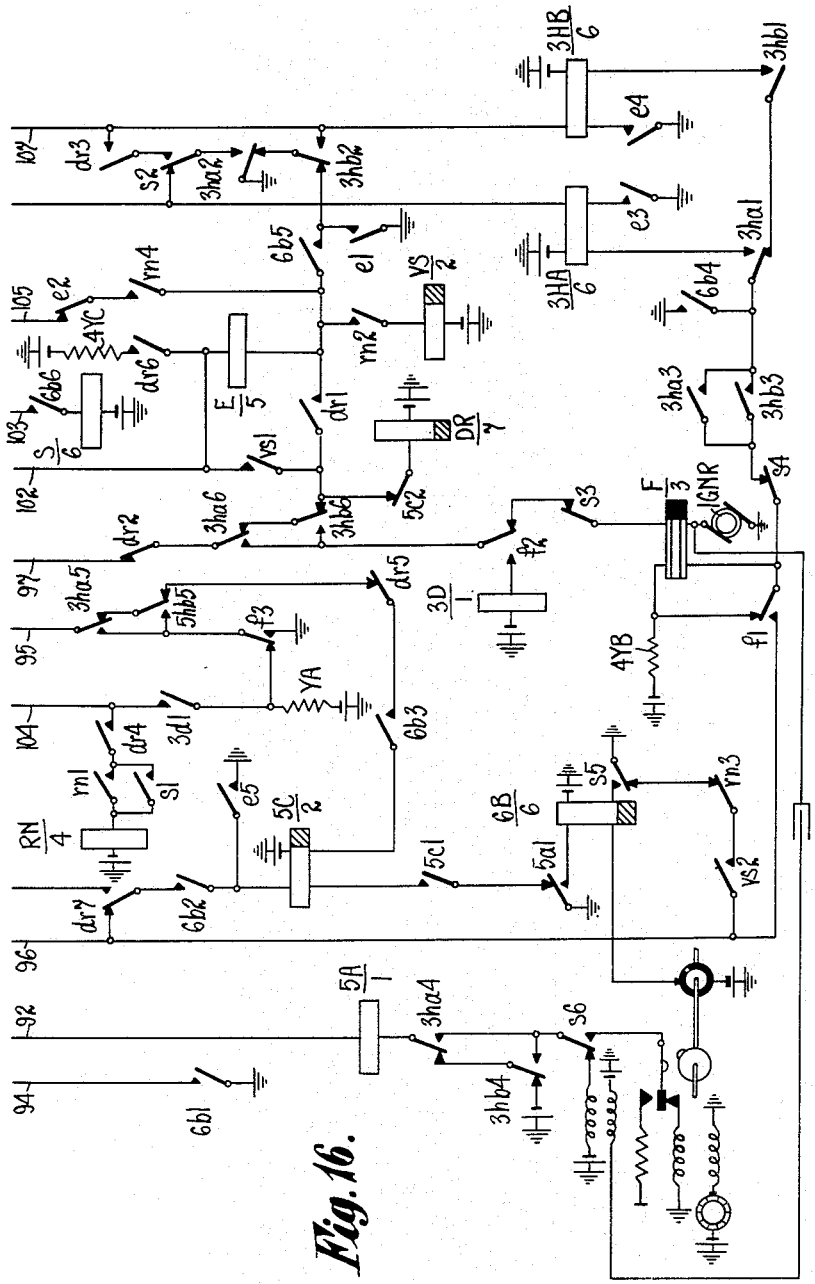
Figure 17:
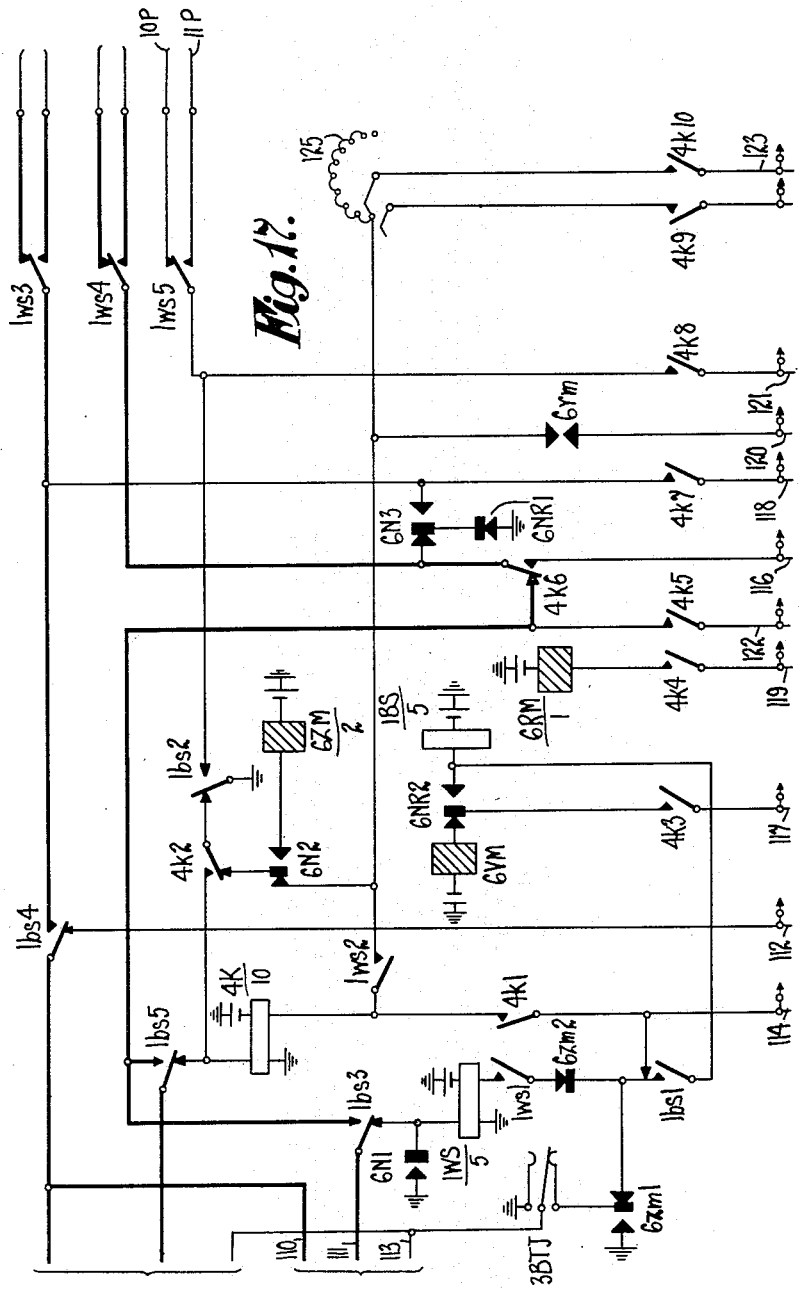
Figure 18:
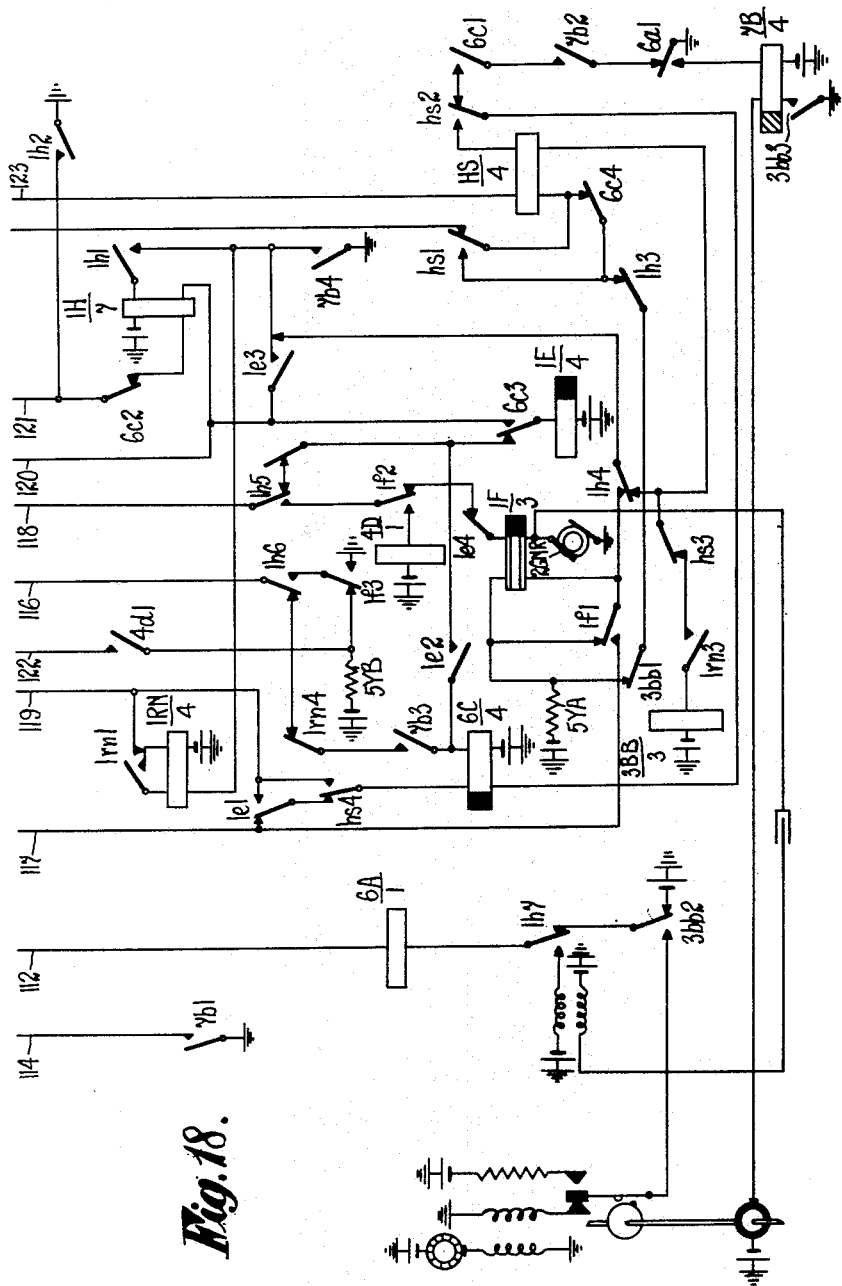

Figs. 1 to 4 arranged as shown in Fig. 5 illustrate a first code selector, Figs. 6 to 9 show a register controller, Fig. 10 shows a 10/10 group selector provided with common control apparatus and re-routing facilities; Figs. 11 and 12 show a 10/20 group selector also provided with common control apparatus and re-routing facilities; Figs. 13 and 14 show a selector repeater arranged to work in conjunction with selectors provided with common control apparatus; Figs. 15 and 16 show a final selector for use in a system employing register controllers and arranged to hunt over more than one level; Figs. 17 and 18 show a final selector for use in a system employing register controllers and arranged to extend connections to individual lines and also to an idle line of a group of 2-10 lines, while Figs. 19 and 20 show a 200 line final selector with common control apparatus.

The first-code selector will be taken into use over a subscriber's line circuit. The first digit transmitted from the register controller will operate the vertical magnet of the first code selector which thereupon hunts for a free group selector of the type shown in Fig. 10 or Figs. 11 and 12. The second digit operates the vertical magnet of said switch which thereupon hunts either for an idle junction to the required exchange or for an idle second group selector according to the number of code digits transmitted from the register controller. The junction terminates at the required exchange in a selector repeater of the type shown in Figs. 13 and 14 and the first two numerical digits will operate the vertical and rotary magnets thereof. The last two numerical digits will be received by a final selector of the type shown in Figs. 15 and 16, Figs. 17 and 18 or Figs. 19 and 20.

Referring now to Figs. 1 to 4, when the first code selector is seized by the preceding line finder or subscriber's rotary line switch, relay L is operated in series with the calling circuit over conductors 10 and 11 and at armature $l1$ prepares a point in the hunting circuit to the "A" digit switch finder ADF and at armature $l2$ operates the guard relay B. Relay B in operating at armature $b1$, Fig. 2, connects earth to the release trunk conductor 12 over a circuit which includes the resting armature $ba3$, operated armature $b1$, conductor 13 and armature $hr1$. At armature $b2$ relay B prepares a circuit to the relief guard relay BA which is operative under certain conditions only, at armature $b3$ prepares a circuit to relay MG, at armature $b4$, Fig. 2, completes a point in the number unobtainable tone circuit, at armature $b5$ completes a point in the circuit to the supervisory lamp LP and at armature b6 completes the automatic hunting circuit for the "A" digit switch finder.

Assuming now that the wipers of the "A" digit switch finder in their first position encounter an "A" digit switch which is already in use on a call, wiper 1h will fail to encounter the low resistance marking battery and in consequence the following circuit is operative for the energization of the interrupter relay MG: earth at armature ba2, Fig. 1, armature l1, off-normal springs N4, armature b6, upper winding of relay K, armature k1, springs N2, armature k9, magnet springs adm, armature hr6, upper high resistance winding of relay MG to battery. Owing to its high resistance relay MG only is operated in this circuit and at armature mg1 completes an alternative circuit to relay B, at armature mg2 opens a point in the through speaking circuit which is without effect at this time and at armature mg3 energizes the driving magnet ADM of the "A" digit switch finder ADF to prepare for the advancement of the wipers into engagement with the next set of contacts. Since now the holding circuit of relay MG includes the magnet springs adm an alternate action will take place between the relay and the magnet until such time as the wiper 1h of the finder switch encounters a free outlet as marked by the connection thereto of a low resistance battery.

When a free outlet is found relay MG is short-circuited against operation by the low resistance battery and owing to the increase of current in the circuit relay K is operated on both its windings in series with the low resistance battery which is derived by way of the resistance YB in parallel with relay 1B. Relay K in operating at armature k1 disconnects the circuit to relay MG and prepares a holding circuit for itself on its lower winding which is sufficiently low in resistance to permit the operation of relay LB in parallel with the resistance YB. Relay K moreover at armatures k2 and k7 inclusive associates the first code switch with the A digit switch selected, at armature k8 prepares a point in the circuit to the release magnet ZM and at armature k9 opens a still further point in the driving circuit to the "A" digit switch finder. It should also be noted that at armature k2 relay K closes a circuit for relay A in the "A" digit switch over wiper 3h of the "A" digit switch finder. At armature a1 relay A opens the circuit of the vertical magnet 1VM while at armature a2 relay A removes a short-circuit from around the winding of relay 1B. In order to guard against the possibility of dual connections it is arranged that the K relays in all first code selectors shall be adjusted so that two of them will not hold operated in parallel on their low resistance windings to battery via resistance YA and relay 1B of any "A" digit switch. Relay 1B in operating at armature 1b1 provides an alternative holding circuit for itself in series with relay K of the first code selector, at armature 1b2 completes a circuit for pre-operating relay C on its left-hand winding, at armature 1b3 connects earth to a common holding lead to which various relays are subsequently locked and at the same time operating relay CA, Fig. 4, on its lower winding, at armature 1b4 prepares a point in the circuit to the rotary magnet 1RM, at armature 1b5, Fig. 4, prepares a circuit for the operation of relays 2I and D, and at armature 1b6, Fig. 4, completes a point in the circuit to the switching relay HC. Relay C in operating at armature c1 prepares a point in the circuit to the vertical magnet 1VM, at armature c3 holds open the circuit of the rotary magnet 1RM for the duration of the vertical impulses, the operation of its other armatures being without effect at this time. Relay CA in operating at armature ca1 prepares the circuit for the operation of relay KR, at armature ca2 prepares a holding circuit for relay A which is operative later, at armature ca3 completes a still further point in the circuit to the vertical magnet 1VM, at armature ca4 prepares a point in the circuit of the meter discriminating relays MA, MB, MC and MD, at armature ca5 prepares a further point in the holding circuit to relay A and at armature ca6 completes a point in the circuit to relay BA of the first code selector which is operated on junction calls only. No further circuit changes take place at the present time and the calling subscriber receives a tone from the "A" digit switch indicative of the dialling condition by way of the resistance off-normal springs 1N3, Fig. 3, condenser QD, conductor 14, wiper 5h and bank contact of the switch ADF, armature k4, springs NR3, condenser QD1, armatures hr8, ba5 and mg2 in parallel, speaking condenser QA, armature or1 and from thence over the upper speaking conductor to the calling subscriber's instrument. The calling subscriber on hearing the tone will then proceed to dial the first letter of the routing digits, whereupon relay L in the first code selector will be operated in synchronism and at armature l2 repeats these impulses to relay A in the first code switch. Upon the first deenergization of relay A the following circuit is completed for energizing the vertical magnet 1VM of the "A" digit switch in series with relay C: earth at armature ca3, Fig. 3, armatures a1 and j5, normal rotary springs 1NR, armature c1, low resistance winding of relay C and vertical magnet 1VM in series to battery. In this manner the vertical magnet is energized to raise the shaft and wipers to the desired level corresponding to the number of impulses in the series and as soon as the shaft is moved from its normal position, the off-normal springs are operated thereby at springs 1N1 opening the initial energizing circuit to relay C and preparing the circuit for the rotary magnet 1RM, at springs 1N2 a point is closed in the short-circuiting path for relay 1B and at springs 1N3 the dialling tone circuit is disconnected. It should be explained that relay C is held operated continuously during the impulsing period by reason of its inclusion in the impulsing circuit and the copper slug surrounding its core, while relay B in the first code switch is held operated under these conditions from earth on the homing plate of the "A" digit switch finder ADF which is now bridged, since the wipers are moved from their home position. At the conclusion of the train of impulses the wipers will be standing opposite the required level and as relay L and consequently relay A in the "A" digit switch are now held operated for an extended period, relay C will release after a short interval and at armature c3 completes a circuit to the rotary magnet 1RM by means of which the wipers are advanced into engagement with the first set of bank contacts. As soon as the shaft commences its rotary movement the rotary off-normal springs are operated thereby at springs 1NR transferring the impulsing circuit from relay A to the meter discriminating group of relays MA to MD.

Assuming now that the register controller connected to the first line in the level selected is already in use, the testing wiper 2P will fail to encounter an idle marking battery and when the rotary magnet springs 1rm close at the end of the magnet stroke a circuit is completed for operating relay G on its right-hand winding in series with the lower winding of relay HC. It should be mentioned that the resistance of relay G is sufficiently high to prevent the operation of relay HC in series therewith. Relay G in operating at armature $g1$ prepares a locking circuit to relay C which is not effective at this stage, at armature $g2$ opens a point in the holding circuit to relay A which is without effect at this time and at armature $g3$ opens the circuit of the rotary magnet 1RM. The rotary magnet is, therefore, de-energized and in turn opens the holding circuit to relay G which also releases and again completes a circuit of the rotary magnet so as to cause the switch wipers to be advanced a further step.

If now the next outlet from the level selected proves busy relay G will again be energized and the interaction of this relay with the rotary magnet 1RM will therefore continue until a free outlet is encountered, or alternatively the wipers are moved into their 11th rotary position.

Considering first the case in which a free outlet is found, wiper 2P will encounter the low resistance idle marking battery from the register controller which serves to short-circuit relay G against operation, and permit the switching relay HC to operate on both its windings in series to earth at armature $j3$. Relay HC in operating at its make-first armature $hc1$ connects up wiper FR to the lower winding of relay A. Wiper FR is connected to the forced release conductor in the register controller and is normally earthed at contact $m4$, Fig. 6, so that this connection provides a holding circuit for the lower winding of relay A during the switching operation of relay HC. The circuit may be traced from: earth at contact $m4$, bank contact and wiper FR, armature $hc1$, armatures $ca2$ and $hc6$, winding of relay 2I and the shunt field relay D in series, conductor 16, armature $ca5$, lower winding of relay A to battery. Moreover, relay HC at armature $hc2$ completes a circuit to the upper low resistance holding winding of relay HC so as to busy the register controller selected and operate a guard relay therein, at armature $hc3$ prepares a further point in the circuit to relay KR, at armature $hc4$ transfers the impulsing circuit from relay A to the wiper PU and bank contact extending to the pulse lead to the register controller selected, and at armatures $hc5$ and $hc6$ extends a holding circuit for the impulsing relay A into the register controller. At armature $hc7$ relay HC causes the re-operation of relay C so that this relay may now function in a meter delay circuit, and at armature $hc8$ opens a point in the time pulse relay TP. The circuit is now in a condition for the calling subscriber to dial the so-called B and C routing digits together with the numerical digits into the register controller selected.

Figure 6:
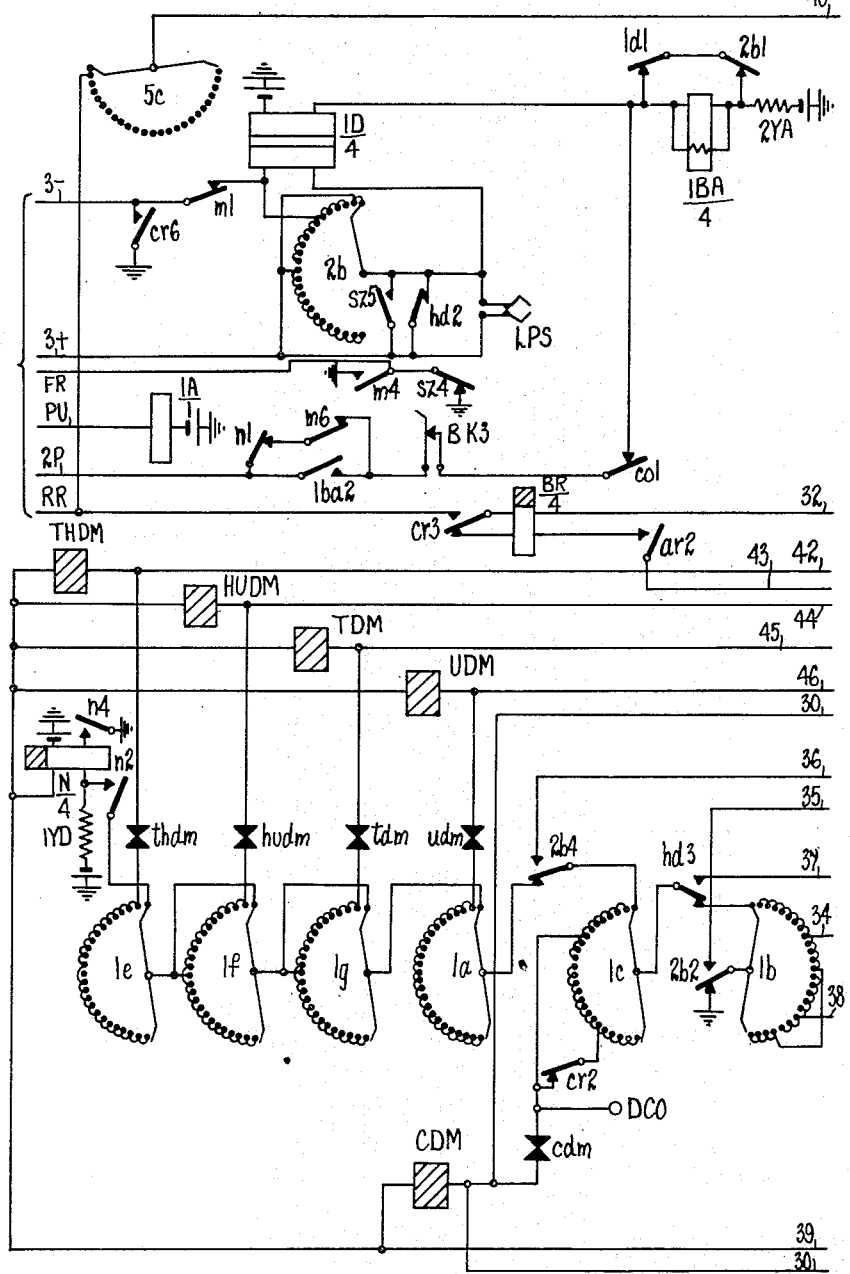
Figure 7:
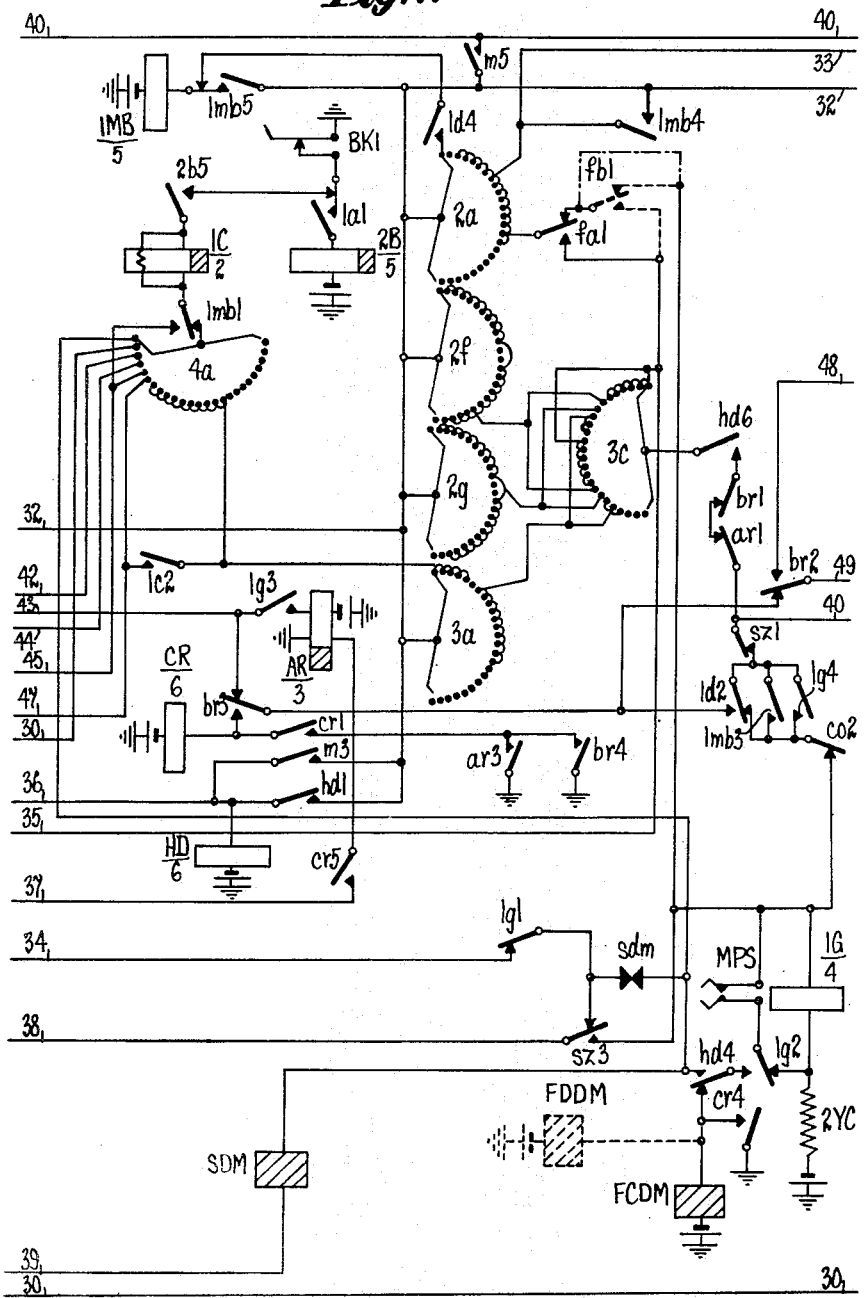
Figure 8:
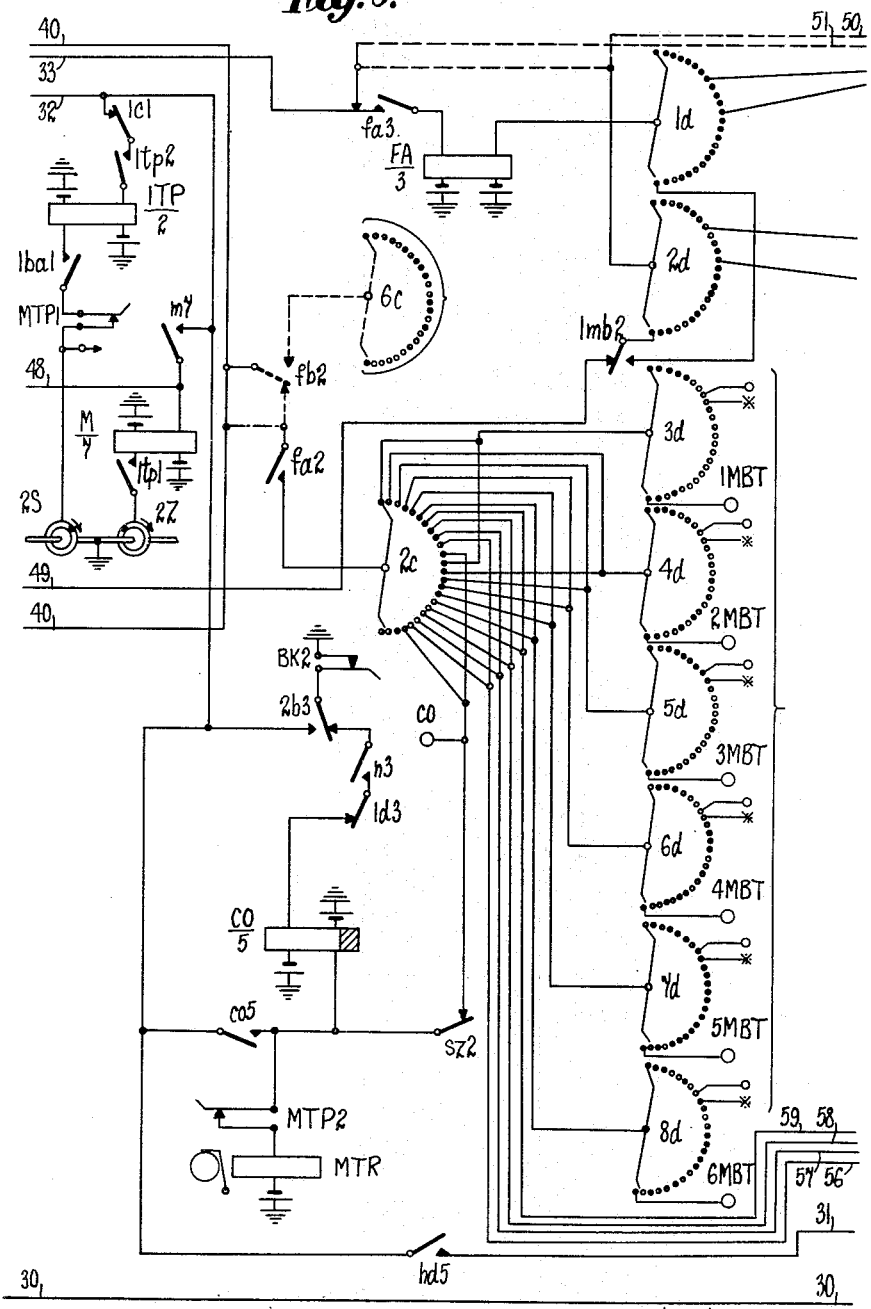
Figure 9:
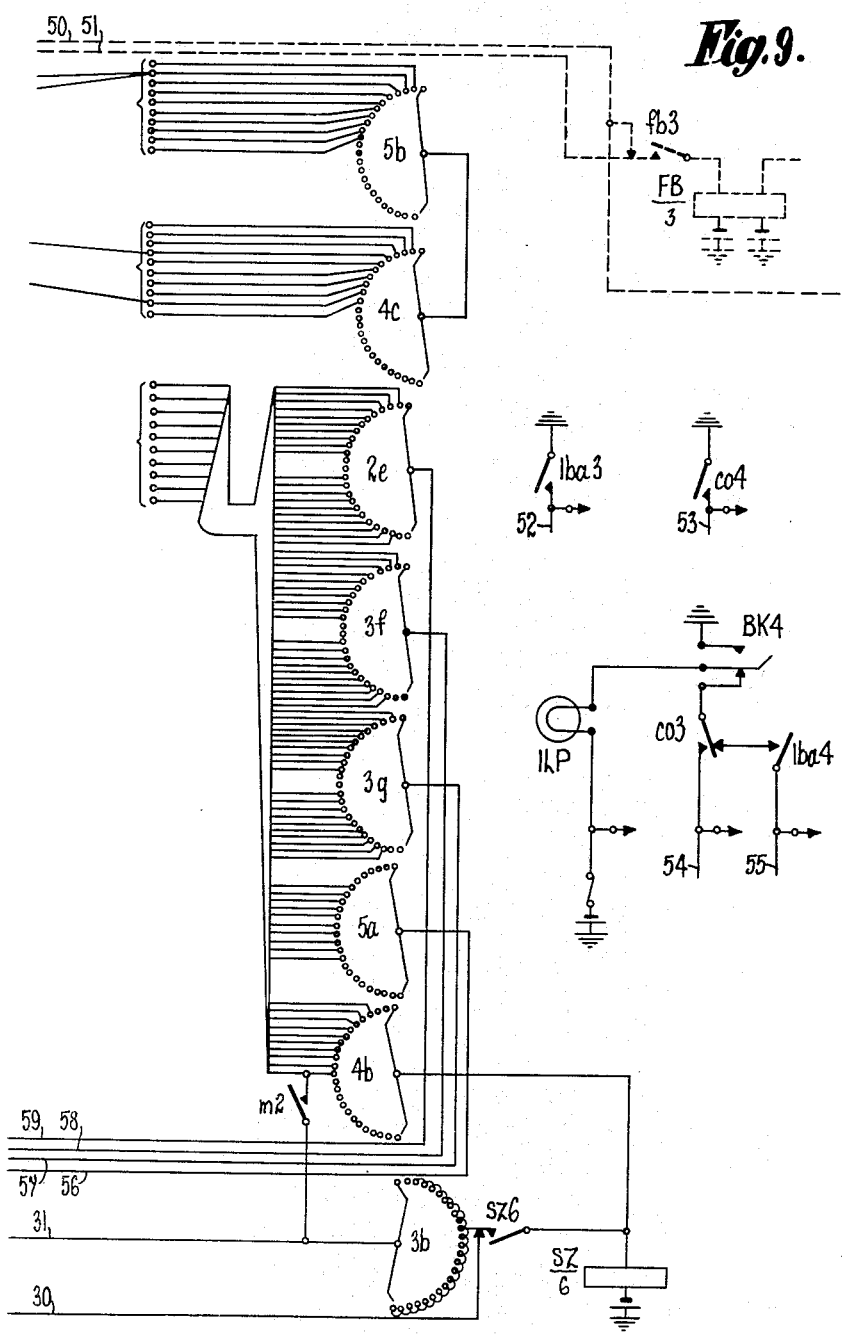

Upon the reception of the "B" and "C" routing digits, relay L in the first code selector will again impulse and owing to the switching operation of relay HC these impulses will be extended by way of the wiper PU and bank contact to the impulsing relay 1A of the register controlled, Fig. 6. Relay 1A at armature $1a1$ will complete the following circuit for relay 2B: earth, normal contact of busying key BK1, contact $1a1$, winding of relay 2B to battery. Relay 2B in operating at armature $2b1$ will remove the short circuit from the winding of relay 1BA, Fig. 6, and so allow this relay to operate in series with resistance 2YA to the earth applied to the release trunk conductor 2P usually via the windings of switching relays in the A digit switch and first code selector. Armature $2b3$ will supply the main switch earth utilized for holding most of the apparatus of the register controller which is operated during the progress of the call and armature $2b5$ prepares the circuit for the operation of the various storing switches. Relay 1BA in operating at armature $1ba1$ connects the left-hand winding of relay 1TP, Fig. 8, to the S pulse cam which is arranged to operate in the well-known manner for the supplying of earth pulses at regular short intervals. Upon the reception of the second code digit, that is, the first digit to take effect in the register translator from the calling subscriber's dial, relay 1A will impulse and at each restoration a circuit will be completed from earth, resting contacts BK1, armatures $1a1$ and $2b5$, winding of relay 1C, armature $1mb1$, wiper $4a$ and first bank contact of the units digit storing switch US, winding of the sender switch driving magnet SDM, conductor 39, low resistance left hand winding of relay N to battery. The sender switch will therefore drive its wipers to a position corresponding to the digit dialled, relays 1C and N operating also on the first impulse. Relay 1C will restore at the end of the train of impulses constituting the digit dialled but relay N will lock up immediately it operates from battery, resistance 1YD, right-hand winding of relay N, armature $h4$ to earth, since relay N is intended to perform the functions usually discharged by the off normal springs on the well known BC switch. It will be seen that the driving magnet UDM of the units digit storing switch will also be energized when relay 1C operates via conductor 46, armature $1c2$, first contact and wiper $3a$ of switch US to the earth via armature $2b3$ and springs BK2 so that when relay 1C restores the wipers of the switch US will be driven into contact with its second set of bank contacts.

The next digit to take effect in the register controller, namely the third code digit, will therefore operate the magnet CDM of the control switch CS via conductor 30, thus setting the wipers of this latter switch to a position corresponding to the digit dialled. The setting of the wipers $5b$ of the sender switch and $4c$ of the control switch, Fig. 9, will result in a marking being extended to the appropriate contacts of those banks of the finder code switch FCS with which wipers $1d$ and $2d$ engage, and since the units digit storing switch will now be in its third position a circuit will be completed from battery, resistance 2YC, winding of relay IG in parallel with the magnet pulse springs MPS and armature $1g2$, armature $fa1$, bank contact and wiper $2a$ of the units switch, conductor 32 to the earth via armature $2b3$ and springs BK2. It should be mentioned here that the alternative dotted connections (which may be termed "dotted" and "chain-dotted" connections) have been shown on the drawings in order to differentiate between the case in which a single finder code switch is used and the case in which, in order to double the translation capacity, two finder code switches are employed. It will be assumed, however, for the purposes of this description that only one finder code switch is employed and therefore the "chain-dotted" connections only are applicable. Upon the next break of the magnet pulse springs MPS relay IG will operate and at armature 1g2 switch the pulsing circuit to the driving magnet FCDM of the finder code switch which will thereupon rotate its wipers in search of the marked contacts. When these are found relay FA, Fig. 8, will operate from battery, right-hand winding of relay FA, wiper 1d and bank contact of finder code switch FCS, cross connection, bank contact and wiper 5b of sender switch wiper 4c and bank contact of control switch, cross-connection, bank contact and wiper 2d of the finder code switch, armature fa3, conductor 33, bank contact and wiper 2a of the units digit storing switch, conductor 32, to the earth via armature 2b3 and springs BK2 and lock up over its left hand winding via armature fa3. At armature fa1 the holding circuit of relay IG and the stepping circuit of the driving magnet FCDM will be simultaneously broken. Relay IG will release and complete the homing circuit of the driving magnet SDM of the sender switch from battery, left-hand winding of relay N, conductor 39, winding of the driving magnet SDM, interrupter springs sdm, armature 1g1, conductor 34, bank contacts and wiper 1b of sender switch, armature 2b2, conductor 35, armature fa1, bank contact and wiper 2a of the units digit storing switch, conductor 32 to the earth via armature 2b3 and springs BK2. The sender switch wipers will therefore be rotated to the home position. The circuit for driving the wipers over the contacts 14 to 21 inclusive is completed via armature sz3 but the true function of this armature will be made apparent later.

When the sender switch has homed, a homing circuit will now be completed for the control switch driving magnet CDM from battery, left-hand winding of relay N, winding of the magnet CDM, interrupter springs cdm, bank contacts and wiper 1c of the control switch, armature 2b2, conductor 35, armature fa1, bank contacts and wiper 2a of the units digit storing switch, conductor 32, to the earth via armature 2b3 and springs BK2. It will be seen that the circuit for stepping the wipers of the control switch over contacts 12 to 25 inclusive is completed via armature cr2; the true function of this armature will be explained later.

When the control switch has reached its home position a circuit will be completed for relay HD from battery, winding of relay HD, conductor 34, armature 2b4, home contact and wiper 1c of control switch, armature hd3, home contact and wiper 1b of the sender switch, armature 2b2, conductor 35, armature fa1, bank contact and wiper 2a of the units digit storing switch, conductor 32 to the earth via armature 2b3 and springs BK2, relay HD thereupon locking up to the same earth via its make first armature hd1. At armature hd6 the circuit for relay IG is prepared from battery, resistance 2YC, winding of relay IG in parallel with armature 1g2 and the magnet pulse springs MPS, armatures co2, 1d2, sz1, ar1, br1, hd6, wiper 3c and bank contact of control switch, armature fa1, bank contact and wiper 2a of the units digit storing switch, conductor 32, to the earth via armature 2b3 and springs BK2 and at the same instant armature hd4 prepares a circuit for the stepping of the sender switch.

Upon the next break of the magnet pulse springs relay IG will operate and at armature 1g2 will connect the sender switch driving magnet SDM to the magnet pulse springs so that the wipers of the sender switch and in particular wiper 4b will be rotated over the bank contacts. It will be understood that the contacts of those banks of the finder code switch with which wipers 3d to 8d engage will be cross-connected as necessary to that bank of the sender switch with which wiper 4b engages in order to provide the required translation in the usual manner. In the particular arrangement described the capacity of the finder code switch is limited to 25 translations but these could readily be increased by the provision of another switch similar to that shown, arranged to operate in parallel therewith in the manner indicated in the drawings.

It will be seen that due to the operation of armature hd2 and the consequent removal of the short circuit from across the loop pulse springs LPS, impulses will be transmitted over the negative and positive conductors 3— and 3+ respectively while the sender switch is rotating. When wiper 4b of the sender switch reaches that bank contact which has been cross connected to the bank contact of the finder code switch upon which wiper 3d is now resting, a circuit will be completed for relay SZ from battery, winding of relay SZ, wiper 4b and bank contact of sender switch, cross connection, bank contact and wiper 3d of the finder code switch, bank contact and wiper 2c of the control switch, armature fa2, conductor 40, armatures ar1, br1, hd6, wiper 3c and bank contact of control switch, armature fa1, bank contact and wiper 2a of units digit storing switch, conductor 32, to earth via armature 2b3 and springs BK2, so that relay SZ will operate and lock up from battery, winding of relay SZ, armature sz6, bank contact and wiper 3b of sender switch, armature hd5, to the earth via armature 2b3 and springs BK2. At armature sz5 the loop pulse springs LPS are again short-circuited in order to stop the sending out of impulses, while at armature sz1 the circuit of relay IG and the stepping circuit for the sender switch is broken so that relay IG will release and at armature 1g1 will complete the homing circuit of the sender switch driving magnet SDM over the contacts 2 to 13 and 22 to 25. The homing circuit over contacts 14 to 21 will be completed, as has previously been stated, via the armature sz3 and the magnet pulse springs MPS in order to ensure that the homing time of the sender switch will cover the hunting time usually allowed for switches which are being set up by the register controller. It should be noted that when wiper 1b of the sender switch has stepped on to the 14th contact, and the magnet pulse springs open, a circuit is again completed for relay 1G as follows: earth, battery, resistance YC, winding of relay IG, contact sz3, conductor 38, 14th bank contact and wiper 1b, contact 2b2, conductor 35, contact fa1, bank contact 2a, conductor 32 to earth at contacts 2b3 and BK2. Relay IG remains energized while the sender switch is stepping over contacts 4 to 21. It should also be pointed out that the circuit of the control switch driving magnet CDM which was energized as soon as the armature hd5 operated will be broken by the operation of armature sz6 so that the control switch wipers will be stepped to the next position.

Upon the reception of the "C" routing digit from the subscriber the register controller sends out the first series of impulses which serve as meter discriminating impulses to operate the meter discriminating relays in the "A" digit switch, by means of which the subscriber may be assessed with one, two or three metering counts according to the destination of a call. In the case of a local call, however, the zone discriminating feature is cancelled by means of strapping on the banks of the finder code switch in the register controller and under these circumstances the first series of impulses delivered therefrom will not produce meter discrimination.

Assuming now that the call is to be extended to an exchange other than the local one, the register controller will first transmit the meter discriminating digits and under these circumstances the holding circuit for relay A will be interrupted once, twice or three times to prepare the "A" digit switch for the registration of single, double or triple metering respectively when the called subscriber answers.

Figure 3:
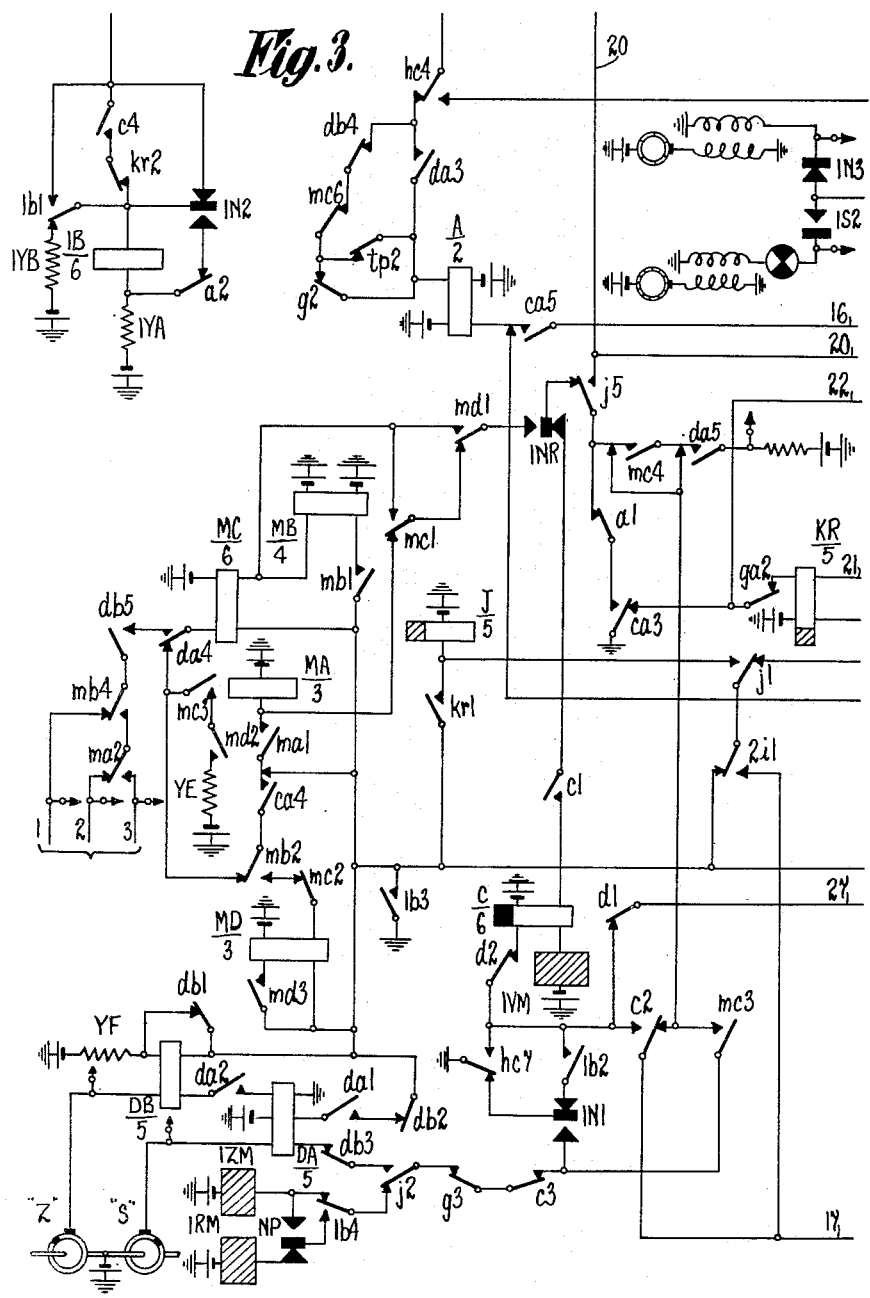

Considering now the extension of the connection to an exchange located in the third zone, relay A will under these circumstances release three times, and upon the first release the following circuit may be traced to the meter discriminating group or relays from: earth at the operated armature ca3, Fig. 3, armatures a1 and j5, normal rotary springs 1NR, armatures md1 and mc1, winding of relay MA to battery. Relay MA is, therefore, operated and at armature ma1 prepares a holding circuit for itself in series with relay MC, at armature ma2 connects up the meter common lead extending to a metering cam arranged to produce three counts, and at armature ma3, Fig. 4, prepares a point in the circuit for operating relay BA in the first code selector. Relay MC does not operate in series with relay MA at this time owing to the fact that it is short-circuited by the earth at contact ca3. At the conclusion of the first pulse, however, relay A will again energize and earth at contact ca3 will be removed from relay MA, whereupon relay MC will then operate in series with relay MA over the circuit: battery by way of relay MA, armatures ma1, ca4, mb2 and da4, lower winding of relay MC to the common holding lead earth. Relay MC in operating at armature mc1 transfers the pulsing circuit to relays MB and MC so that upon the next release of relay A, relay MB energizes in parallel with relay MC. Relay MB in operating at armature mb1 completes a locking circuit for itself, and at armature mb2 opens the holding circuit of relay MA and completes a point in the circuit to relay MD which is, however, not completed at this time since relay MC is held operated during the continuance of the pulse in parallel with relay MB. Upon the third fall away of relay A relay MA is again energized since relay MC is by now released, and at the conclusion of the pulse since relay MB is operated a series holding circuit will be completed by way of the right-hand winding of relay MD which also operates. Thus it is seen that one pulse operates relays MA and MC, two pulses operate relay MB, three pulses operate relays MA and MD and in addition hold relay MB while four pulses operate relay MC and in addition hold relays MB and MD. The transmission of four pulses from the register controller does not correspond to a meter setting and is provided for a special purpose which will be described later.

Returning now to the operation of the register controller it will be remembered that upon the operation of relay SZ at the termination of the first train of impulses, the circuit of the control switch driving magnet CDM was opened at armature sz6 so that the control switch wipers were stepped on to the second contact. A circuit is then completed for relay KR in the "A" digit switch over the following circuit: earth, contacts BK2, 2b3, conductor 32, wiper 3a and bank contact of the units switch, contact ja1, bank contact and wiper 3c of the control switch, contacts hd6, br1, ar1, conductor 40, wiper 5c and second bank contact of the control switch rerouting conductor RR, upper winding of relay CA, contacts hc3, ca1, lower winding of relay KR to battery. Relay KR in operating at armature kr1 completes a circuit to relay J which thereupon locks by way of its armature j1 to earth on the holding conductor, at armature kr2 opens a point in the holding circuit to relay 1B which is without effect at this time, at armature kr3 prepares a point in the impulsing circuit to the rotary magnet of the first code selector, and at armatures kr4 and kr5 connects relay GA in circuit with the testing wipers P and 1P of the first code selector. Moreover relay J in operating at armature j1 disconnects the initial energizing circuit for relay CA which, however, remains held on its upper winding in series with relay KR, at armature j2 completes a circuit to relays DA and DB which control the duration of the metering period, at armature j3 completes an alternative locking circuit over conductor 17 for relay C, and at armature j5 transfers the impulsing circuit of relay A to the vertical magnet VM of the first code selector. In order that this circuit may work in with the common control switches described later in the specification it is necessary that on local calls the first code selector should feed a transmission battery to the called subscriber while on junction calls an impedance bridge alone will suffice, since under these circumstances the incoming switch will provide the necessary transmission circuit for the calling subscriber. In order that these conditions may be fulfilled without the employment of additional switching means, advantage is taken of the fact that the so-called double guard feature is only required on calls proceeding over two wire junctions, that is, on calls requiring extension of a forward impedance bridge circuit, and consequently as the additional guard relay BA need only be operated on this type of call it may be conveniently provided with armatures arranged to substitute the battery feed by an impedance bridge. The operating circuit of relay BA is controlled by relays MA or MB in the "A" digit switch since it will be appreciated from the previous description that neither of these relays will be operated on a local call. In the case of a junction call, however, one or both of these relays must be operated and at the conclusion of the transmission of the metering pulses when relay KR is operated the following circuit may be traced to operate relay BA in the first code selector from: battery by way of the resistance YD, Fig. 4, armatures ma3 or mb3, armatures ca6 and kr4, conductor 18, bank contact and wiper 7a of the switch ADF, armature k6, off-normal springs N3, conductor 19, armatures b2, winding of relay BA to earth. Relay BA in operating at armature ba1 locks up in an alternative circuit from battery by way of the resistance YA, at armature ba2 prepares a point in the forward holding circuit to the junction, at armature ba3 assumes control of the guarding earth to the release trunk conductor 12, at armature ba4 prepares a point in the lower winding of relay MG and at armature ba5 opens a point in the upper speaking conductor. In the case of a local call, however, neither relay MA nor relay MB will be operated and hence there will be no circuit for the operation of relay BA. Battery is, however, fed to the called subscriber over the following circuit: battery, resistance YA, contact ba1, lower winding of relay II, contact hr9, conductor 15, contacts ha6 or hb4 wiper and bank contact 1+ or 2+ respectively, subscriber's instrument, bank contact and wiper 1— or 2—, contacts ha5 or ha6 respectively, contact hr8, conductor 26, contact ba5, upper winding of relay II, resistance YB, contacts l1, ba2 to earth. Relay II will operate over this circuit and a contact 1i1 open the circuit to the supervisory lamp LP.

Returning now to the operation of the register controller when the sender switch has reached the home position at the end of the transmission of the first train of impulses, the holding circuit of relay SZ will be broken so that this relay will restore and at armature sz1 again complete the circuit of relay 1G and the sender switch magnet SDM to allow the second series of impulses to be sent out. Upon the reception of the second series of impulses from the register controller corresponding to the first routing digit in the translated code, the holding circuit to relay A in the "A" digit switch will be interrupted the requisite number of times by the impulse device in the register controller, and accordingly the vertical magnet of the first code selector is energized to raise its wipers to the desired level. Upon the first release of relay A under these conditions a circuit may be traced from earth at the armature ca3, armatures a1, and j5, conductor 20, bank contact and wiper 4h of the switch ADF, armature k3, normal rotary springs NR1, winding of the vertical magnet VM to battery. During the first vertical movement the off-normal springs are operated thereby at springs N1 preparing a point in the circuit to the release magnet ZM, at springs N2 the homing circuit is prepared to the "A" digit finder ADF and at springs N3 the initial energizing circuit is opened to relay BA. At the conclusion of the train of impulses the wipers will be standing opposite the required level and relay A is held operated and as the control switch in the register translator is now moved into its third position preparatory to the sending of the third digit, earth is disconnected from the bank contact and wiper RR, so that relays CA and KR are released. It should be explained, however, that relay KR is not released immediately owing to the presence of the copper slug surrounding its core and during this interval, the following circuit is completed to the rotary magnet of the first code selector by means of which the wipers are advanced into engagement with the first set of bank contacts: earth at the resting armature ca3, Fig. 3, armature ga2, low resistance winding of relay KR, conductor 21, armature kr3, conductor 14, wiper 5h and bank contact of the switch ADF, armature k4, armatures ha6 and hb4, winding of the rotary magnet RM to battery. As soon as the shaft commences its rotary movement the rotary off-normal springs are operated thereby at springs NR1 disconnecting the circuit to the vertical magnet VM and preparing a circuit to relay KR, at springs NR2 opens a further point in the circuit to the vertical magnet, at springs NR3 opens a further point in the dial tone circuit, and at springs NR4 prepares a circuit to the switching relays HA and HB. As will be seen from the drawings two sets of line wipers are provided designated 1 negative and 1 positive and 2 negative and 2 positive arranged to establish connection simultaneously with an upper and lower set of contacts, each extending to a separate line.

Assuming now that the first two lines in the level selected are busy, both testing wipers P and 1P will encounter earth which serves to short-circuit the switching relays HA and HB to prevent their operation and when the rotary magnet springs rm close at the end of the magnet stroke a circuit will be completed by way of armature k6, wiper 7a and bank contact, conductor 18, armatures kr4 and ca6, to effect the operation of relay GA on its left-hand winding. Relay GA in operating at armature ga1 completes a locking circuit over conductor 22 for its right-hand winding, at armature ga2 opens the energizing circuit of the rotary magnet RM and at armature ga3 connects the test wiper 1P in circuit with the battery connected side of the locking winding of relay GA. Owing to the fact that the testing wiper 1P is also in engagement with an earthed bank contact, relay GA is, therefore, short-circuited and released to complete the circuit to the rotary magnet RM again which advances the wipers on to the next set of bank contacts.

If the testing wipers P and 1P again encounter the busy lines relay GA will be operated and released in the manner described above to cause the magnet to take a further step and this action will continue until a free line is encountered, or alternatively the wipers are moved into their 11th rotary position. It will be appreciated that relay KR is intermittently energized owing to the inclusion of its low resistance winding in series with the magnet circuit, and by reason of the copper slug surrounding its core this relay remains held operated continuously during the hunting period.

Considering first the case in which a free outlet is encountered by the testing wiper P, relay GA will not again be operated owing to the absence of earth on the test contact and as the short-circuit is removed from the winding of the switching relay HA this relay will operate in series with relay GA and lock by way of its armature ha1. It should be mentioned that the resistance of relay HA is sufficiently high to prevent the operation of relay GA in series therewith. Upon the operation of the switching relay HA, at armature ha2 the operating circuit of relay HB is opened, at armature ha3 a still further point is opened in the circuit to relay HB, at armature ha4 direct earth is connected to the test wiper P and bank contact to busy the switch selected and at armatures ha5 and ha6 the speaking conductors are extended by way of wipers 1 negative and 1 positive and bank contacts to the switch ahead.

If the wiper 1P should encounter the first free outlet, relay GA will be operated when the magnet springs close and locks in the manner already described, but since the switching relay HB is no longer short-circuited it will operate in parallel with the right-hand winding of relay GA and disconnect the operating circuit to relay HA. Relay HB in operating performs the similar function to relay HA with the exception that the line wipers 2 negative and 2 positive are connected up so as to establish connection over the lower set of bank contacts.

In the case when both test contacts P and 1P encounter free outlets simultaneously, relay HA will operate in series with the left-hand winding of relay GA and at armature ha3 open the circuit to relay HB to prevent its operation. Although the test wiper 1P encounters a free outlet at the same time as test wiper P, relay HB is unable to operate as its circuit is open at contact ga3.

In case the first code selector should fail to find a free outlet on the level selected the wipers will be rotated to their 11th position where the cam springs are operated, thereby at springs S1 opening the circuit of the testing wiper 1P and when the rotary magnet springs rm close at the end of the magnet stroke, switching relay HA will be operated to terminate the rotary movement and to extend the impulsing circuit from the register controller to the 11th step bank contacts. If this level is one in which the re-routing facility is not provided the 11th set of contacts will be wired in accordance with the upper set shown adjacent to the wipers, Fig. 4, so that by this means the regular busy tone conditions are connected up to the calling subscriber's instrument to inform him that the connection is unavailable. The operations taking place if the level is one on which the re-routing facility is provided will be considered later.

Relay KR releases at the end of the automatic rotary period and at its armature kr4 or kr5 transfers the locking circuit of the operated switching relay by way of the testing armature ca1, operated armature hc3, winding of relay CA, wiper RR and bank contact to battery over resistance YG. Owing to the comparatively high resistance of the switching relay, relay CA does not operate in series therewith. The operation of either switching relay HA or HB extends the impulsing loop from the register controller to the switch selected and this circuit may be traced in detail from: wiper 3 negative of the "A" digit switch, Fig. 4, armatures hc5 and c6, conductor 23, bank contact and wiper 6a of the switch ADF, armatures k5 and ha5, or alternatively hb3, negative wiper of the first code switch which is connected up at this time, calling circuit to switch selected, positive wiper connected up at this time, armature ha6 or hb4, armature k4, wiper 5a and bank contact of the switch ADF, conductor 14, armatures kr3, ca2 and hc6 to the wiper 3 positive to the "A" digit switch.

The remaining digits dialled by the subscriber are stored on the numerical switches THS, HUS and TS, the units switch US functioning as a control switch until the reception of the final digit when it acts as a units register, the operating circuit being completed by way of its own bank contacts. The remainder of the routing digits and the numerical digits are transmitted over the above traced circuit to set up the train of automatic switches in a manner to be described later. It should also be mentioned that the received impulses from the calling subscriber will continue to be accepted on the register controller by way of the wiper PU and bank contact, although the input circuit and the output circuit are running concurrently, the connections between the third bank of the control switch shown in Fig. 7 and the contacts of the numerical switches with which wipers 2f, 2g and 3a are engaged preventing the sending operation from overruning the storing of the numerical digits.

When all the trains of impulses have been received on the register controller and re-transmitted therefrom, the control switch steps its wipers on to the 11th bank contact, if the connection has been set up direct to the subscriber, or the 22nd bank contact if re-routing has taken place. In either case a circuit is closed for relay CO in the register controller, Fig. 8, over the circuit: battery, right-hand winding of relay CO, contact sz2, 11th or 22nd bank contact of the bank associated with wiper 2c, wiper 2c, contact fa2, conductor 40, contacts ar1, br1, hd6, wiper 3c of control switch, contacts 11 or 22, bank contact and wiper 3a of the units storing switch, conductor 32 to earth over contacts 2b3 and BK2. Relay CO operates and locks up over contact co5 to earth on conductor 32 and at contact co1 opens the circuit for relay 1BA and the polarizing winding of relay 1D in the register controller and also of relay HC in the "A" digit switch. Also since relay J in the "A" digit switch is operated, earth will now be removed from the test wiper 2P. Upon the release of relay HC the holding circuit for the switching relay in the first code selector is transferred at armature hc3 by way of armature j4 to battery from the resistance YD, and at armature hc6 the high impedance relay I and shunt-field relay D are substituted in place of the register controller impulsing circuit to hold the train of switches set up. Further at armature hc4 the circuit is opened to the impulsing relay 1A in the register controller whereupon this relay de-energizes and at contact 1a1 opens the circuit to relay 2B. Relay 2B on releasing removes earth at armature 2b3 from conductor 32 to which all the relays in the register controller are locked. All these relays will thereupon release and since the sender switch will have been rotated to its normal position at the termination of the last impulse transmission, a homing circuit will be completed for the control switch as follows: battery, left-hand winding of relay N, control switch magnet CDM, interrupter springs cdm, bank contact and wiper 1c, contact hd3, first contact and wiper 1b to earth at armature 2b2. The control switch will thus be stepped to its normal position whereupon homing circuits will be closed in turn for the numerical storing switches which will also return to normal. When the numerical switches and the sender switch and control switch are returned to normal earth is extended from armature 2b2 over the wipers 1b, 1c, 1a, 1g, 1f and 1e in series, to shunt the battery over resistance YD whereupon relay N releases and the register controller is returned to its normal position.

Returning now to the operation of the first code selector if the required subscriber is free at this time the final switch in the train will extend a ringing circuit to his instrument and during this period a tone indicative of the ringing condition is extended over the negative junction conductor to inform the calling subscriber that the call is proceeding. This circuit may be traced in detail from the negative wiper of the first code selector, armatures ha5 or hb3, armature k5, wiper 6h and bank contact of the switch ADF, conductor 23, armatures c6 and hc5, condenser QE, conductor 20, bank contact and wiper 4h of the switch ADF, armature k3, conductor 24, rotary off-normal springs NR3, condenser QD, armature hr8, armature mg2, speaking condenser QA, armature or1, negative conductor 10 to the calling party. If, however, the subscriber should be busy when his line is connected with the final switch in the train a ringing circuit will not be connected up, and instead a different tone indicative of the busy condition is extended back over the circuit previously traced to inform the calling subscriber that the wanted line is unavailable. In the case of a busy connection the "A" digit switch remains held until the calling subscriber clears his connection and should this occur during the flash period of the busy signal when the call has proceeded over a junction, the circuit is arranged to hold the junction temporarily and, therefore, guard it against further selection until the apparatus set up at the distant exchange has fully restored to normal.

Considering now the circuit operations involved when the calling subscriber replaces his telephone, the holding circuit to relay L is opened so that it releases and in turn releases relay A in the "A" digit switch, Fig. 3. Relay A in releasing at armature a2 in conjunction with the operated off-normal springs 1N2 short-circuits relay 1B for an extended period of time sufficient to release this relay and when it restores the following circuit may be traced for holding relay 2I to maintain the connection: flash battery on the positive junction conductor by way of the wipers and bank contacts of the first code selector, armature ha6, or hb4, armature k4, wiper 5h and bank contact of the switch ADF, conductor 14, armatures kr3, ca2, and hc6, winding of relay 2I, resting armature 1b5, conductor 22, to earth at armature ca3. Relay 2I therefore holds during the flash period and at armature 2i1 provides a holding circuit for relay J since the original holding circuit from earth at armature 1b3 is now opened. Relay J in turn holds relay C at armature j3 and the latter at armature c4 maintains a locking circuit for relay K in the first code selector. At the conclusion of the flash period relay I releases and is followed by relay J, and later, by relay C so that until the slow period of both these relays have elapsed the locking circuit to relay K will be maintained and the first code selector is therefore, held to busy the junction selected. In this manner a double guard period after the release of the connection is maintained on the junction to ensure the full release of the switches in the distant office. Relay K in releasing completes a homing circuit for the "A" digit switch finder ADF and when the latter has reached its home position relay B and in turn relay BA restore so that the circuit is then complete to the release magnet ZM which removes a locking detent from the shaft to enable it to restore the wipers to the home position. It will be noticed that the release magnet is equipped with two sets of springs designated zm1 and zm2 the former arranged to connect a guarding earth to the release trunk conductor 12 until the wipers are actually in their home position, while the latter locks in the release magnet during a different releasing condition which will be described later.

Considering now the progress of a successful call, when the called subscriber removes his receiver, the ringing is tripped in the final switch in the train and a reversed battery condition is extended over the junction circuit to effect the operation of the shunt field relay D in the "A" digit switch. Relay D in operating at armature d1 opens a point in the circuit to the time pulse relay TP, Fig. 4, and at armature d2 opens the circuit to relay C. It will be seen that relay C is equipped with a copper slug so that it will only release by the definite opening of its circuit at armature d2 and is not responsive in case relay D should flick owing to surges produced possibly by condenser surges in the junction circuit. Relay C in releasing completes the following circuit for the operation of relay HR in the first code selector: earth at armature j3, Fig. 4, conductor 17, armatures c2, mc4 and j5, conductor 20, bank contact and wiper 4h of the switch ADF, armature k3, spring NR1, winding of relay HR to battery. Relay HR is operated primarily to connect up the junction line through at its armatures hr8 and hr9 so as to enable conversation to take place between the calling and called subscribers during the progress of the metering operation. At armature hr1 relay HR prepares a locking circuit for itself and at armature hr2 prepares a circuit for the extension of booster battery metering impulses to the release trunk conductor 12, and at armatures hr3 and hr4 provides an alternative locking circuit for the switching relays HA or HB whichever may be operated. Upon the release of relay C the meter controlling relays DA and DB are connected in circuit with the "S" and "Z" pulse time cams. As will be seen from the drawings this arrangement consists of two cams rotated by a common shaft arranged to connect battery impulses alternately to the leads "S" and "Z" having a definite period of time between each application.

Considering now the application of a battery pulse to the lead "S", a circuit may be traced for operating relay DA over its lower winding in circuit with the armatures db2, j2 and c3 and the off-normal springs 1N1 to earth at armature hc7. Relay DA in operating at armature da1 completes a locking circuit to its center winding controlled by relay DB, at armature da2 prepares a circuit for relay DA in series with relay DB, at armature da3 prepares an alternative holding circuit for relay A, at armature da4 prepares a circuit to relay MC, and at armature da5 prepares a point in the booster circuit to the release trunk conductor. No further circuit operations will take place until the appropriate interval of time has elapsed, at the conclusion of which a battery pulse will be connected to the "Z" conductor thereby effecting the operation of relay DB on its lower winding in series with relay DA which holds. Relay DB in operating opens up the short circuit on its upper winding so that it may lock for the remainder of the connection to earth at armature 1b3. At armature db2 relay DB opens the locking circuit to relay DA, at armature db3 opens the initial energizing circuit to relay DA, at armature db4 opens the original holding circuit to relay A, and at armature db5 connects relay MC in circuit with the appropriate meter pulse lead which is connected up in accordance with the combination of the meter discriminating relays as previously described. Since in the particular circumstances under discussion it has been assumed that relays MB and MA are operated the circuit of relay MC is connected to the meter pulse lead designated 3 to which three battery impulses will be connected during the continuance of the "Z" pulse. In this manner relay MC is operated three times and at armature mc4 will make three separate applications of booster battery in place of earth to the release trunk conductor 12 to effect the operation of the calling subscriber's meter in a known manner. Since the booster battery potential is considerably higher than the normal exchange potential, all relays which have been locked to the release trunk conductor will remain held on a reversed current which is produced by the momentary application of the higher potential. At the conclusion of the meter period which coincides with that of the "Z" pulse application, relay DA will release, but relay DB remains held to the holding conductor so as to prevent the further application of metering pulses during this particular call. Relay DA moreover opens the circuit to relay A which releases and short-circuits relay 1B, and upon the release of the latter relay, earth is disconnected from the holding conductor so that all relays which happen to be locked thereto at this time are released and the following circuit is completed to the release magnet of the "A" digit switch: earth at armature hc7, Fig. 3, off-normal springs 1N1, armatures c3, g3, j2 and 1b4, winding of release magnet 1ZM to battery. The magnet in energizing removes the locking detent from the switch shaft which immediately restores under the influence of a spring or the like to its normal position at which the off-normal springs will again open and the circuit is then completely restored. Relay K in the first code selector is also released and completes a homing circuit for the "A" digit switch finder AD. Relay HR is operated at this time and remains locked in a circuit which may be traced from: earth at the operated armature ba3, conductor 13, operated armature hr2, resting springs of armature k3, springs NR1, winding of relay HR to battery while in parallel therewith the holding earth is extended by way of the operated armature hr1 to the release trunk conductor 12 to guard the circuit and hold the preceding switches. When the "A" digit switch finder arrives in its home position, the earthed bridge on the homing plates will be removed but as relay K is released at this time relay B is maintained in a circuit which includes the resting armature k2.

If a subscriber wishes to call the manual operator the digit "0" is dialled whereupon the wipers of the "A" digit switch are raised to the 10th level and as the pulsing conductors 3— and 3+ extending therefrom are reversed, the polarized relay 1D as well as relay LA will be operated immediately the register controller is taken into use. Relay 1A causes the operation of relay 2B with results hereinbefore described. The operation of relay 1D closes a circuit for relay 1MB from earth, battery, winding of relay 1MB, armature 1d4, wiper 2a, conductor 32 to earth through armature 2b3 and springs BK2. Relay 1MB locks up at armature 1mb5 to conductor 32. At armature 1mb2 relay 1MB connects together the last contacts in those banks of the finder code switch with which wipers 1d and 2d engage. At armature 1mb4 a circuit is closed for relay IG from earth, battery, resistance 2YC, winding of IG, armature fa1, bank contacts of wiper 2a, armature 1mb4, conductor 32 to earth through armature 2b3 and springs BK2. When the magnet pulse springs MPS next open, relay IG operates and closes an energizing circuit for the finder code switch magnet FCDM from earth, battery, magnet FCDM, armature 1g2, springs MPS to earth by the same circuit as that for relay IG. The wipers 1d to 8d of the finder code switch are thereupon stepped automatically to the 25th bank contact in order to set up the translation for establishing connection with the manual operator. When the wipers reach the 25th contact a circuit is closed for relay FA from earth, battery, right-hand winding of relay FA, wiper 1d, 25th bank contact, 25th bank contact of wiper 2d, conductor 33, armature 1mb4, conductor 32 to earth. At armature fa1 the circuits for the finder code switch magnet and relay IG are broken.

It will be appreciated that on subscriber to subscriber calls the release of the "A" digit switch is dependent upon the completion of the metering operations but in the case of calls to a manual operator which are not chargeable against the subscriber in the ordinary way the metering operation must necessarily be suspended and special means must, therefore, be provided to secure the release of the "A" digit switch as soon as the register controller has routed the call to the manual board. For this purpose advantage is taken of the meter discriminating group of relays which are operated to a setting which does not correspond to a zone selection, and in order to carry this into effect the register controller jumpering field is wired so that a preliminary digit of 4 is transmitted. In response to this digit a similar sequence of operations to that already described will be carried out and relays MA, MB and MC are operated. Relay BA is also operated under these conditions so as to disconnect the battery feed to the calling side of the circuit and connect up in its place an impedance bridge which is necessary for the operation of the manual board apparatus. When the register controller has sent out the complete set of routing digits required to direct the call to the manual board the cut off relay CO therein is immediately operated to release relay HC in the "A" digit switch in the manner already explained. Relay HC in releasing opens the holding circuit to relay A and as the initial energizing circuit to this relay is now opened at armature mc6 it releases and short-circuits relay 1B which also restores. Relay 1B in releasing removes earth from the holding lead to restore the meter discriminating group of relays together with relays J and MC, and during the slow-releasing period of the latter relays relay HR in the first code selector operates so that the through speaking connection may be established. Relay HR is caused to operate by an impulse delivered over the following circuit: earth at the resting armature hc7, springs 1N1, armatures mc5, da5, mc4 and j5, conductor 20, armature k3, springs NR1, winding of relay HR to battery. Upon the release of relays 1B and C in the "A" digit switch, the circuit is opened to relay K in the first code selector which also restores and permits the "A" digit switch finder ADF to be automatically rotated to its home position. Upon the release of relay K a holding circuit for relay HR is completed from earth at the operated armature ba3. The "A" digit switch is now available for further use. In case the calling subscriber should replace his receiver before the manual operator clears her connections, a manual holding feature will then become operative which consists in the application of battery potential from the manual board apparatus over the positive junction conductor, and under these circumstances a circuit will be completed by way of armature ba4, lower winding of relay MG, armatures hr7 and b3, to earth at armature l2. Relay MG is, therefore re-operated and at armature mg1 holds relay B and in turn relay BA to prevent the release of the connection. Should it become necessary for the operator to recall the subscriber during these conditions she may do so by connecting up ringing current to the negative junction conductor which will find a circuit by way of the operated armature of the switching relay, armature hr8, conductor 26, condenser QC, relay OR which is bridged by the metal rectifier MRC, armatures hr5 and mg3 to earth. Owing to the presence of the rectifier in the circuit, half wave rectification will be effected insofar as the energization of relay QR is concerned and the relay is therefore enabled to hold operated continuously during the ringing period. Relay OR in operating at armatures or1 and or2 completes a local ringing circuit for re-calling the subscriber and at the same time disconnects the line relay L and the speaking condensers from the circuit.

In case a busy condition should be encountered during the setting up of a call, so making it necessary to re-route the call by way of a different channel, a re-routing signal comprising a low frequency alternating current will be extended back over the speaking leads to effect the intermittent operation of the polarized relay 1D in the register controller. As a particular instance the case will be taken of the first code selector failing to find an outlet on a level provided with this re-routing facility, while the case of other switches of the train failing to find an outlet will be considered later. In the case of a first code selector if the level selected is one on which re-routing facilities are available the 11th step contacts on those levels will be wired in accordance with the lower set shown adjacent to the wipers (Fig. 2) so that under these circumstances ringing current will be extended from the generator shown back along the impulsing circuit to the register controller.

It will be appreciated that since the first code selector has registered the "all-outlets-busy" condition it must have driven its wipers eleven rotary steps after the operation of relay SZ in the register controller so that at the commencement of the re-routing signal the sender switch will be stepping over the contacts 14–21 under the control of the pulse strings MPS; the actual contact in this group with which wiper 1b is engaging when the re-routing group signal arrives is immaterial. Relay 1G will also be operated at this period so that upon the first operation of relay 1D in response to the first pulse of alternating current relay AR will operate from: battery, upper winding of relay AR, contacts 1g3, br3, 1d2, 1g4, co2, sz3, bank contacts and wiper 1b to the sender switch, armature 2b2, conductor 35, armature fa1, bank contact and wiper 2a of the units switch, conductor 32 to earth at contacts b3 and bk2. When relay D restores, relay BR will operate in series with relay AR, the circuit being: battery, upper winding of relay AR, armature 1g3, conductor 43, contact ar2, lower winding of relay BR, contacts cr3, upper winding of relay BR, conductor 32 to earth at contacts 2b3 and BK2. At armature br3 relay BR prepares a circuit for relay CR so that on the next operation of the polarized relay 1D, relay CR will operate over the following circuit: earth, battery, winding of relay CR, contacts br3, 1d2, 1g4, co2, conductor 41, contact sz3, conductor 38, bank contact and wiper 1b of the sender switch, contact 2b2, conductor 35, contact fa1, bank contact and wiper 2a, conductor 32 to earth at contacts 2b3 and BK2. Relay CR operates and locks up over armature cr1 to earth at armatures ar2 and br4. At armature cr3, the holding battery to the switching relay HA of the first code selector is short-circuited whereupon relay HA releases and closes a circuit for the release magnet ZM of the first code selector from: battery, winding of release magnet ZM, rotary off normal springs NR5, contact k8, off normal springs N1, contacts hb3, ha4, k5, wiper and bank contact 6h of the "A" digit switch, conductor 23, contacts c6, hc5, wiper 3— to earth at contact cr6. The release magnet thereupon energizes to restore the shaft and wipers to normal and at springs zm2 locks itself until the home position is reached, since the initial energizing circuit by way of springs NR5 will be opened at the commencement of the rotary return movement. It should be noted that relay BR is now held over its upper winding only and since this is of low resistance while resistance YG is high, relay BR will release. Relay AR is held over its lower winding from earth, contact cr5, conductor 37, conduct hd3, wiper and bank contact 1c of the control switch, springs cdm, winding of control switch magnet CDM, winding of relay N to battery. Thus the control switch will be stepped to the 12th contact over the above traced circuit. The homing circuit over contacts 13 to 26 is opened at this time at contact cr2. Upon the release of relay BR, relay AR will be held over its upper winding over a circuit similar to the initial energizing circuit of relay CR and this obtains until the sender switch has stepped to its 22nd contact when it is no longer under the control of the magnet springs MPS. Relay IG thereupon releases and causes the release of relay AR followed by the release of relay CR. The sender switch completes its rotation to a home position over the self-interrupting circuit previously traced. It should be noted that the earth extended over armature cr3 to conductor RR serves to operate relay CA in the first code selector over: earth at wiper RR, upper winding of relay CA, contacts hc3, ca1, kr4, conductor 18, bank contact and wiper 7h of the "A" digit switch, contact k6, off-normal springs N3, conductor 19, contact ba1 to battery over resistance YA. Relay CA locks up over contact ca1 in series with relay KR which also operates. This prepares the first code selector for the reception of the re-routing digits. Further at armature cr6 earth is removed from wiper 3—, while at armature cr4 the circuit of the finder code switch magnet, completed on the operation of relay CR, is opened, whereby the finder code switch wipers are stepped to their next contacts so that the re-routing digits may be sent out. It should be pointed out that since, in order to effect re-routing, relay 1D must operate and release twice while the sender switch wipers are rotated over the contacts 14 to 21, it is obvious that any operation of relay 1D when performing its well known function of delaying sending until a particular switch in the train is ready to receive impulses, will not set the re-routing function of the register controller into operation.

Consideration will now be given to the operation of the first code selector and the register controller under abnormal conditions. In the case of premature dialling, that is, when the subscriber operates his calling device prior to the receipt of the tone indicative of the dialling condition, the "A" digit switch finder will have failed to find a free "A" digit switch, and in consequence relay K will not be operated. Intermittent energization of relay L therefore will result in the operation of the vertical magnet VM of the first code selector. Immediately the first code selector moves from its normal position, the automatic finding circuit for the "A" digit switch finder ADF is discontinued by the operation of the off-normal springs N2, while at springs N1 a number unobtainable tone circuit is completed in the manner previously described to inform the calling subscriber that the desired connection is unavailable. The individual supervisory lamp LP is lit in circuit with a main alarm (not shown) which becomes operative after a predetermined delay period.

In case the calling subscriber should establish connection with an "A" digit switch but fail to operate his calling device within a predetermined period of time the connection is released and the number unobtainable tone is again transmitted to the calling subscriber.

Referring now to the detailed circuit operations for this feature it will be seen that relay C of the "A" digit switch in operating at armature $c5$ connects one winding of the time pulse relay TP in circuit with the "S" cam of a timing arrangement similar to that employed for controlling the meter period. Upon the connection of earth over the "S" pulse conductor relay TP is operated and at armature $tp1$ completes a locking circuit for its centre winding over conductor 27, armatures $d1$ and $1b2$, resting springs 1N1 and armature $hc7$ to earth. Relay TP moreover at armature $tp2$ opens a point in the holding circuit to relay A, Fig. 3, at armatures $tp3$ and $tp4$ prepares a point in the circuit for the energization of relays G and TP in parallel and at armature $tp5$ connects the left-hand winding of relay G in circuit with the "Z" pulse conductor. Assuming now that the subscriber fails to dial within the predetermined period of time corresponding to that for which the timing cams are set, an earth pulse will be delivered over the "Z" pulse conductor to secure the operation of relay G on its left-hand winding. Relay G in operating under these circumstances at armature $g1$ completes a locking circuit for itself and in addition extends earth by way of the low resistance right-hand winding of relay TP over conductor 20 by way of the bank contact and wiper $4h$ of the switch ADF, armature $k3$, springs NR1 to energize the vertical magnet VM of the first code selector, thereby causing the shaft and wipers to be moved from their normal position in order to prepare for the extension of the number unobtainable tone to the calling subscriber. In addition, since both relays TP and G are operated at this time the holding circuit to relay A is opened so that it releases, and in turn short-circuits relay 1B which also releases to open the circuit to relay C, and upon the release of the latter relay the holding circuit to relay K in the first code selector is also opened. By this means the "A" digit switch finder is restored to its home position and number unobtainable tone is extended to the calling subscriber to inform him that the desired connection is unavailable. The "A" digit switch is thus released for further use under these conditions. The supervisory lamp LP is again lit in circuit with the main alarm device.

In case the calling subscriber hangs up at the moment of seizure of the "A" digit switch without operating his calling device relay A in the latter may or may not become fully operated, but in any case relay 1B is almost certain to be operated and in turn operates relays C and CA. Under these circumstances the vertical magnet of the "A" digit switch will be energized over the circuit: earth at the armature $ca3$, Fig. 3, armatures $a1$ and $j5$, springs 1NR, armature $c1$, low resistance winding of relay C in series with the vertical magnet 1VM to battery. The "A" digit switch will therefore be moved from its normal position and since relay A is normal at this time relay 1B becomes short-circuited so that it releases and in turn opens the holding circuits of relays C and CA. In this manner the release of relay K in the first code selector is ensured by the disconnection of the idle marking battery from the contact encountered by wiper $1h$ of the switch ADF.

Considering now the possibility of the calling subscriber dialling the full office code and failing to dial the remainder of the numerical digits it will be appreciated that under these conditions the register controller will upon the reception of the final office code digit commence to transmit the corresponding translated routing digit. Consequently the first code selector will be stepped to a certain level so that it cuts in and a partial train of switches will be set up corresponding to the routing train of digits. In the register controller relay 1TP will be held up sufficiently long to enable the Z-pulse to operate relay M through armature $1tp1$. Relay M locks up at armature $m7$ to conductor 32 and at armature $m5$ prepares a circuit to relay IG from earth, battery, resistance 2YC, winding of relay IG, contacts $co2$, $1d2$, $sz1$, conductor 40, armature $m5$, conductor 32 to earth over contacts $2b3$ and BK2. At armature $m1$ relay M opens the pulsing out circuit while at armature $m4$ relay M closes a circuit for relay HD, from earth, battery, winding of relay HD, armature $m4$, conductor 32, home. At armature $m8$, relay M short-circuits the holding battery to switching relay HA or HB in first code selector. Relay HD operates and locks up armature $hd1$ while at armature $hd4$ closes one point of the energizing circuit for the sender switch magnet SDM. When the magnet springs MPS next open relay IG will operate over the circuit traced above and at armature $1g2$ will close the energizing circuit for the sender switch magnet. The wipers of the sender switch will thus be stepped round automatically to 13th bank contact when a circuit is closed over relay SZ from earth, battery, winding of relay SZ, wiper $4b$ and bank contacts, armature $m2$, conductor 31, armature $hd5$ at armatures $2b3$ and $bk2$. Relay SZ locks up at armature $sz6$ and at armature $sz4$ removes earth from the forced release conductor FR. The removal of earth from conductor FR causes the release of relay A in the "A" digit selector. Relay A thereupon brings about the restoration of the A digit switch as already described. In these circumstances a vertical impulse is not delivered to the first code selector since its wipers are already in an off-normal position and the conditions are therefore suitable for the transmission of number unobtainable tone to the calling party.

If the subscriber dials only one or two digits, and fails to complete the full office code, the "A" digit switch will respond and as already described choose an idle register controller in the selected group. After a predetermined period relay M in the register controller operates and disconnects earth from the bank contact and wiper FR and connects earth to bank contact and wiper RR as described above. Since relay CA is operated at this time a circuit is completed by way of its upper winding for relay KR which operates on its lower winding and completes an energizing circuit for relay J. Consequent upon the disconnection of earth from the bank contact and wiper FR relay A which is holding thereto is released, and at armature $a2$ in conjunction with the operated off-normal springs 1N2 short-circuits relay 1B which also releases to disconnect earth from the main holding conductor. During the release period of relay 1B the following circuit may be traced to energize the vertical magnet of the first code selector from: earth at the operated armature $ca3$, Fig. 3, armatures $a1$ and $j5$, conductor 20, bank contact and wiper $4h$ of the "A" digit finder ADF, armature $k3$, resting springs NR1, winding of the vertical magnet VM to battery. In this manner the shaft and wipers are raised to the first level so that the off-normal springs are operated, and when the "A" digit switch fulfills its release operation the holding circuit to relay K in the first code selector is also disconnected to enable the number unobtainable tone circuit to be completed as far as the calling subscriber's instrument in the manner already described. Consequently under these conditions the "A" digit switch and the register controller are released for further use while the first code selector is retained until the calling party clears his connection.

Considering now the possibility of the "A" digit switch failing to encounter a free register controller on the level selected the wipers will under these circumstances be rotated into their 11th position where cam springs are operated, thereby at springs 1S1 completing a locking circuit for the interrupter relay G so as to terminate the rotary movement, at springs 1S2 extends busy tone over the circuit already traced to the calling subscriber, and at springs 1S3 connects earth to the wiper 2P and bank contact to effect the operation of an overflow meter (not shown) which is connected to all such 11th step contacts and provided for the purpose of recording overflow calls.

It should also be explained that the first level of the "A" digit switch is unwired as regards outlet to a register controller, since it is generally well accepted in telephone practice that the first switch in any train responsive to impulses from the subscriber's calling device shall guard against the possibility of a false first impulse which may be produced by the inadvertent flicking of the switch-hook or by any other means. In consequence therefore the "A" digit switch under discussion is provided with what are known as normal post springs designated NP and arranged to be operated when the wipers are set opposite the first level. It will be appreciated, therefore, in case a false first impulse is received these springs will close and upon the release of relay C which normally provides the initial impulse to the rotary magnet the circuit is diverted to the release magnet 1ZM which restores the switch to normal in readiness for the legitimate train of impulses.

In case the calling party should dial a spare or unallotted code the finder code switch will fail to find two similar markings in those of its banks with which wipers 1d and 2d engage and it will therefore continue to rotate and as wiper 2d sweeps past the last contact in the bank relay AR will be energized from battery, upper winding of relay AR, armatures 1g3, br3, br2, conductor 48, armature 1mb2, contact and wiper 2d of finder code switch, armature fa3, conductor 33, bank contact and wiper 2a of units switch, conductor 32, armature 2b3, contacts BK2 to earth, and will thereafter be held operated in series with relay BR. The switch will continue its rotation until wiper 2d again encounters the last contact in the bank, whereupon relay M will be operated from battery, right hand winding of relay M, conductor 47, armature br2, conductor 48, armature 1mb2, bank contact and wiper 2d of finder code switch, armature fa3, conductor 33, bank contact and wiper 2a of units switch, conductor 32, armature 2b3 and springs BK2 to earth in order to bring about the forced release condition so that the connection may be cleared.

Referring now to Fig. 10 when a loop is extended to the switch from the first code selector over conductors 60 and 61, relay 2A in the common equipment and relay 1K individual to the switch taken into use are operated in series over the circuit: earth by way of the left-hand winding of relay 1K, armature h5, conductor 61, calling circuit, conductor 60, armature h4, armature armature rr3, winding of relay 2A, armature bb2, to battery. Relay 1K in operating at armature 1k1 completes a locking circuit for its right-hand winding by way of the resting armature h1 and busying test jack BTJ to earth fed forward over the release trunk conductor 62, from the preceding switch. This forward earth by way of armature h1 will also be extended to the common conductor 63, and from thence in parallel to all such circuits associated with the common equipment so as to mark them as busy and prevent their selection by other switches until the common equipment is again free for use. Relay 1K moreover at armature 1k2 prepares a point in the busy circuit at armatures 1k3 and 1k4 respectively prepares circuits to the driving magnets of the switch taken into use, and at armature 1k5 connects the lower winding of relay H in circuit with the test wiper 3P. Relay 2A in the common equipment closes a circuit for relay 3B which operates and at armature 3b1 replaces the earth fed forward from the first code selector at armature 3b2 prepares the circuit to the vertical magnet 2VM, at armature 3b3 prepares the circuit to the rotary magnet 2RM, and at armature 3b4 opens a point in the circuit to the release magnet 2ZM. No further circuit changes take place until the reception of the first series of impulses, when relay 2A in the common equipment will be operated in synchronism with the impulses and at each de-energization will complete the following circuit for energizing the vertical magnet 2VM and relay 2C in series. Earth at armature 2a1, armatures 3b2 and bb3, low resistance winding of relay 2C, armature 1k4, resting rotary off-normal springs 2NR1, winding of the vertical magnet 2VM to battery. In this manner the vertical magnet is energized to raise the shaft and wipers to the desired level, corresponding to the number of impulses in the series and relay 2C is also energized. It should be explained that relays 2C and 3B are each provided with copper slugs surrounding their cores so as to enable them to hold operated continuously throughout the impulsing period. Relay 2C is operated primarily to hold open the circuit to the rotary magnet 2RM until the conclusion of the vertical impulsing period and is provided with other armatures the effect of which will be described hereafter. During the first vertical step the off-normal springs are operated whereupon at springs 2N1 the left-hand winding of relay 1K is short-circuited so as to provide a more effective impulsing circuit, at springs 2N2 a further point is closed in the rotary magnet circuit and at springs 2N3 a circuit is prepared to the release magnet 2ZM. At the conclusion of the train of impulses the wipers will be standing opposite the required level and as relay 2A is now held operated for an extended period relay 2C releases after a short interval, and at armature 2c1 completes a circuit for the rotary magnet 2RM by means of which the wipers are advanced into engagement with the first set of bank contacts. As soon as the shaft commences its rotary movement, the rotary off-normal springs are operated thereby at springs 2NR1 opening the circuit to the vertical magnet 2VM, so that this magnet shall not be influenced by further impulsing.

Assuming that the first line in the level selected is busy the test wiper 3P will encounter earth which serves to short-circuit the switching relay H to prevent its operation, and when the rotary magnet springs 2rm close at the end of the magnet stroke, a circuit is completed to relay 2G which operates. Since the circuit of the rotary magnet 2RM includes the armature 2g2 the magnet will be de-energized thereby opening the contacts 2rm, whereupon relay 2G will also be de-energized and again completes the circuit of the rotary magnet so as to cause the switch wipers to be advanced a further step. If the line now engaged is busy, relay 2G will be again energized and the interaction of relay 2G and the magnet 2RM will continue until a free line is encountered or alternatively the wipers are moved into their 11th rotary position.

Considering first the case in which a free outlet is found, relay 2G will not again be operated owing to the absence of earth on the test contact and as the short circuit is removed from the winding of the switch relay H this relay will operate in series with relay 2G and complete a locking circuit for itself by way of its armature $h1$ to earth on the release trunk conductor 62. Upon the operation of the switching relay H, at armature $h2$ the release trunk conductor 62 is extended by way of the test wiper 3P and bank contact to the switch head, at armature $h3$ a further point is opened in the circuit for the release magnet 2ZM and at armatures $h4$ and $h5$ the speaking conductors 60 and 61 are extended by way of the wipers and bank contacts to the switch ahead. Relay 2A in the common equipment is disconnected by the operation of armatures $h4$ and $h5$ and upon releasing opens the circuit of relay 3B which in turn opens the locking circuit of relay 1K and removes the guarding earth from the common lead 63 so as to free the common equipment for use on a further call.

Considering now the condition when all outlets in the level selected are busy, the wipers of the switch will then be rotated to their 11th position in which the cam springs are operated, thereby at springs 2S1 connecting direct earth to the test wiper 3P so as to effect the operation of an overflow meter (not shown) which is multiplied to all 11th step contacts and is provided for the purpose of registering overflow calls on all levels. Moreover at springs 2S2 a circuit is completed to the busy relay BB in the common equipment which at armature $bb1$ provides a locking circuit for relay 2G so as to terminate the rotary movement, and at armatures $bb2$ and $bb3$ effects the necessary transfer of the windings of the relays 2A and 3B to permit the transmission of a busy signal to the calling subscriber. It will be appreciated from the cam assembly shown that the busy signal will consist of an earthed tone and flash battery which are connected up alternately to the winding of relay 2A. During the periods when battery is connected by way of the winding of relay 2A to the calling circuit which are considerably in excess of that represented by the normal slow releasing period of relay 3B, battery is connected by way of the other cam assembly shown to maintain a holding circuit by way of the right-hand winding of relay 3B.

Considering now the condition when all outlets on a level provided with re-routing facilities are busy the wipers will be operated to their 11th position so as to actuate the cam springs as already explained, and also under these circumstances normal post springs 2NP are operated whereupon a circuit is completed for operating relay RR in the common equipment. Relay RR in operating at armature $rr1$ provides a locking circuit to relay 2G to terminate the rotary movement, at armature $rr2$ opens a point in the release magnet circuit, and at armature $rr3$ connects alternating current over the negative conductor 60 to the register controller, whereupon the connection is released and the call is re-routed as previously described. In particular the release of the first code selector causes the removal of forward earth from the release trunk conductor 62 to restore the switch. Relay RR is released, and at armatures $rr2$ closes the circuit to the release magnet 2ZM which is energized in series with the left-hand low resistance winding of relay 2C. Relay 2C is, therefore, operated during the release movement and in the event of the switch failing to restore to normal owing to some mechanical defect, a circuit will be completed from earth at the resting armature $3b1$ and operated armature $2c2$ to light the supervisory lamp 2LP in circuit with a delayed alarm device which will operate after the period for which it is set to draw attention to the faulty condition. Moreover at armature $2c3$ earth is extended over conductor 64 to a total calls meter not shown, which is operated once for each time the common equipment is taken into use to provide an indication of its traffic carrying capacity.

Referring now particularly to Figs. 11 and 12 these show a selector circuit similar to that previously described only in this case provided with double the number of outlets and arranged for testing over an upper and lower level simultaneously with priority switching on each.

When the switch shown is taken into use over conductors 65 and 66 relay 2K is operated in series with relay 3A of the common equipment in the circuit similar to that previously described. Relay 2K in operating at armature $2k1$ completes a locking circuit for its right-hand coil by way of the resting armatures $1hb1$ and $1ha1$, busying test jack 1BTJ, to earth fed forward over the release trunk conductor 67 from the preceding switch. Similarly this forward earth will also be extended to the common conductor 68 and from thence in parallel to all circuits associated with this particular common equipment so as to mark them as busy until the common equipment is again free for use. Relay 2K moreover at armature $2k2$ prepares a point in the busying circuit, at armatures $2k3$ and $2k4$ respectively prepares circuits to the driving magnets of the switch taken into use and at armatures $2k5$ and $2k6$ connects the switching relays 1HA and 1HB in circuit with their respective testing wipers 4P and 5P. Relay 3A in the common equipment operates relay 4B which at armature $4b1$ supplements the earth connected to the common conductor 68, at armature $4b2$ prepares the circuit to the vertical magnet 3VM, at armature $4b3$ prepares a circuit to the rotary magnet 3RM and at armature $4b4$ opens a point in the circuit to the release magnet 3ZM. This condition will obtain until the reception of the first series of impulses whereupon relay 3A in the common equipment will be operated in synchronism and at each de-energization will complete the following circuit for energizing the vertical magnet 3VM and relay 3C in series: from earth at armature $3a1$, armatures $4b2$ and $1bb3$, low resistance winding of relay 3C, armature $3g3$, conductor 79, armature $2k4$, rotary off-normal springs 3NR, winding of the vertical magnet 3VM to battery. In this manner the vertical magnet is energized to raise the shaft and wipers to the desired level corresponding to the number of impulses in the series, and relay 3C is also energized over its low resistance winding.

In connection with relays 3C and 4B it should be mentioned that each are equipped with copper slugs so as to enable them to hold operated continuously throughout the impulsing period. Relay 3C is operated primarily to hold open the circuit to the rotary magnet 3RM until the conclusion of the vertical impulsing period, and the relay is also provided with other armatures for connecting up circuits which become operative at a later period. On the first vertical step off-normal springs are operated thereby at springs 3N1 short-circuiting the left-hand winding of relay 2K so as to provide a more effective impulsing circuit, at springs 3N2 a point is prepared in the circuit to the release magnet 3ZM and at springs 3N3 a further point is closed in the circuit to the rotary magnet 3RM. At the conclusion of the first train of impulses the wipers will be standing opposite the required level and as relay 3A is now held operated relay 3C will release after a short interval and complete a circuit for the rotary magnet 3RM by means of which the wipers are advanced into engagement with the first set of bank contacts. As soon as the shaft commences its rotary movement the rotary off-normal springs 3NR are operated, thereby opening the circuit to the vertical magnet 3VM and at the same time connecting the testing wiper 5P in circuit with relay 3G. As will be seen from the drawings two sets of line wipers are provided designated 70, 71 and 72, 73 arranged to establish connection simultaneously with an upper and lower set of contacts, each set extending to a separate line.

Assuming now that the first two lines in the level selected are busy both testing wipers 4P and 5P will encounter earth potential which serves to short-circuit the switching relays 1HA and 1HB to prevent their operation, and when the rotary magnet springs 3rm close at the end of the magnet stroke, a circuit will be completed over conductor 74 to operate relay 3G on its right-hand winding. Relay 3G in operating at armature 3g1 completes a locking circuit for its left-hand winding, at armature 3g2 opens the energizing circuit of the rotary magnet 3RM which, therefore, releases and at armature 3g3 connects the test wiper 5P to the battery connected side of the locking winding of relay 3G. Owing to the fact that the testing wiper 5P is also in engagement with an earthed bank contact the left-hand winding of relay 3G is short-circuited and relay 3G therefore releases and again completes the circuit to the rotary magnet 3RM which advances the wipers on to the next set of bank contacts.

If the testing wipers 4P and 5P again encounter busy lines, relay 3G will be operated and released in the manner described to cause the magnet to make a further step and this action will continue until a free line is encountered or alternatively the wipers are moved into the 11th rotary position.

Considering first the case in which a free outlet is encountered by the testing wiper 4P, relay 3G will not again be operated owing to the absence of earth on the test contact, and as the short circuit is removed from the winding of the switching relay 1HA this relay will operate in series with relay 3G and lock on its upper winding to earth on the release trunk conductor 67. It should be mentioned that the resistance of relay 1HA is sufficiently high to prevent the operation of relay 3G in series therewith. Upon the operation of the switching relay 1HA at armature 1ha2 the release trunk conductor 67 is extended by way of the test wiper 4P and bank contact to the switch ahead, at armature 1ha3 a further point is opened in the circuit to the release magnet 3ZM and at armatures 1ha4 and 1ha5 the speaking conductors 65 and 66 are extended by way of the wipers 70 and 71 and bank contacts to the switch ahead. Relay 3A in the common equipment is disconnected by the operation of armatures 1ha4 and 1ha5, and in turn releases relay 4B after its slow period. Relay 4B in releasing disconnects earth from the common conductor 68 to free the common equipment for further use, and at the same time releases relay 2K to dissociate the group selector taken into use from the common leads to the common equipment.

In case the wiper 5P should encounter the first free outlet, relay 3G will be operated and locked as already described, and as the switching relay 1HB is no longer short circuited it will then operate in parallel with the left-hand winding of relay 3G and lock on its other winding to earth on the release trunk conductor 67. Relay 1HB in operating performs a similar function to relay 1HA with the exception that line wipers 72 and 73 are connected up to establish connection over a lower set of bank contacts.

Considering now the condition when all the outlets in the level selected are busy, the wipers of the switch will be rotated to the 11th position where cam springs are operated, thereby at springs 3S1 connecting direct earth to the test wiper 4P so as to effect the operation of an overflow meter (not shown) which is multipled to all 11th step contacts, and provided for the purpose of registering overflow calls on all levels. Relay 3G is also operated and locked to terminate the rotary movement. Moreover at springs 3S2 a circuit is completed over conductor 75 to operate the busy relay 1BB in the common equipment which at armature 1bb1 opens the circuit of relay 1HB to prevent its operation, and at armatures 1bb2 and 1bb3 to effect the necessary transfer of the windings of relays 3A and 4B to permit the transmission of a busy signal to the calling party to the effect that the number dialled is unavailable.

It will be appreciated from the cam assembly shown in the drawings that the busy signal will consist of earthed tone and flash battery which are connected up alternatey to the winding of relay 3A. During the periods when battery is connected by way of the windings of relay 3A to the calling circuit which are considerably in excess of that represented by the normal releasing period of relay 4B, battery is connected by way of the other cam assembly shown to maintain a holding circuit to the right-hand winding of relay 4B.

Considering now the condition when all the outlets on a re-routing level are busy the wipers will be operated to their 11th position where the cam springs and normal post springs 3NP are operated, earth will be transferred to conductor 76 to effect the operation of relay 1RR in place of relay 1BB as previously explained. Relay 1RR in operating at armature 1rr1 opens the switching circuit to relay 1HB, at armature 1rr2 opens a point in the circuit to the release magnet 3ZM and at armature 1rr3 extends alternating current over the common conductor 57 by way of the resting armatures 1hb4 and 1ha4 to the negative conductor 65 extending to the register controller. Upon the reception of the signal at the register controller the re-routing facility is brought into operation and for this purpose the first code selector is released, thereby disconnecting the forward earth from the release trunk conductor 67 preparatory to the setting up of a new connection as previously described. Under these conditions all relays in the switch in question including relay 1RR will be released and the following circuit is then completed to the release magnet 3ZM: earth at the operated off-normal springs 3N2, armatures 1hb3 and 1ha3, release magnet 3ZM, conductor 78, armatures 1rr2 and 4b4, low resistance left hand winding of relay 3C to battery. Relay 3C is, therefore, re-operated during the release movement and in case, owing to some mechanical defect, the switch should fail to restore to normal, a circuit will be completed from earth at the resting armatures 3a1 and 4b2, operated armature 3c2, to light the supervisory lamp 3LP in circuit with the delayed alarm device which will operate after the period for which it is set to draw attention to the faulty condition. Moreover, at the operated armature 3c3 earth is extended over conductor 79 to a total calls meter, not shown, which is operated once for each time the common equipment is taken into use to provide an indication of the traffic carried in any given period.

Referring now to Figs. 13 and 14 when the selector repeater there shown is taken into use over conductors 80 and 81, relay 4A is operated over the calling circuit and at armature 4a1 operates the guard relay 5B, Fig. 14. Relay 5B in operating at armature 5b1 connects earth to a holding conductor 82 to which various relays are subsequently locked, and at the same time energizes the polarizing winding of the shunt field relay 2D, Fig. 13. At armature 5b2, Fig. 13, a circuit is closed for relay 2BB, at armature 5b3 prepares a point in the impulsing circuit to the vertical magnet 4VM, at armature 5b4 prepares a point in the driving circuit to the rotary magnet 4RM and at armature 5b5 connects the switching relay 2HA in circuit with the upper test wiper 6P. Relay 2BB in operating at armature 2bb1 removes the short circuit from the armature 4a2 so that it may be effective as regards impulsing the selected switch, at armature 2bb2 prepares a locking circuit for itself, at armature 2bb3 prepares an alternative circuit to relay 4A, at armature 2bb4 completes a further point in the impulsing circuit to the vertical magnet 4VM and relay 4C, and at armature 2bb5 operates relay 1DA which thereupon locks in a circuit controlled by the shunt field relay 2D. Relay 1DA moreover at armatures 1da2 and 1da3 holds open the reversed battery circuit from relay 4A until a later period, at armature 1da4 removes the short circuit from the line winding of the shunt field relay 2D, at armature 1da5 opens the initial energizing circuit to relay 2BB. At armature 1da6 relay 1DA removes the short circuit from the right-hand winding of relay 3I so that this relay may now be operated on both windings in series over the following circuit: battery by way of the low resistance 3YC, cam springs 4S2, armatures 2hb5 and 2ha5, windings of relay 3I in series, line winding of shunt field relay 2D, armatures 4a2, 2ha4, 2hb4, and 4c3 to earth at armature 5b2. Relay 3I in operating at armature 3i1 provides a locking circuit to relay 2BB before this relay has time to release owing to the opening of its circuit at armature 1da5, at armature 3i2 and 3i3 prepares an alternative circuit to relay 4A and at armature 3i4 prepares a further circuit to relay 4A which will become operative in case a busy connection is encountered. No further circuit changes take place until the reception of the first series of impulses, whereupon relay 4A is operated in synchronism and at each de-energization completes the circuit at armature 4a1 for energizing the vertical magnet 4VM and relay 4C in parallel. In this manner the vertical magnet is enabled to raise the shaft and wipers to the desired level corresponding to the number of impulses in the series. In connection with relays 4C and 5B it should be mentioned that each are provided with copper slugs to enable them to hold operated continuously throughout the impulsing period. Relay 4C in operating at armature 4c1 opens a point in the driving circuit to the rotary magnet 4RM, at armature 4c2 short-circuits the shunt field relays 2D and 3I but this operation is without function at this time, at armature 4c3 maintains a circuit to relay 2BB since relay 3I is released, and at armature 4c4 opens a point in the circuit to the alarm lamp CSH.

During the first vertical step the off-normal springs are operated thereby at springs 4N1 preparing a circuit for the initial step of the rotary magnet 4RM, at springs 4N2 prepares an alternative circuit for the reoperation of relay 4A when the calling circuit is again closed, and at springs 4N3 prepares the circuit to the switching relays 2HA and 2HB. At the conclusion of the train of impulses the wipers will be standing opposite the required level and as relay 4A is now held operated relay 4C will release after a short interval to complete a circuit for the rotary magnet 4RM by means of which the wipers are advanced into engagement with the first set of bank contacts. As soon as the shaft commences its rotary movement the rotary off-normal springs 4NR1 are operated thereby opening the circuit to the vertical magnet 4VM so that the latter shall not be influenced upon the reception of the subsequent trains of impulses. As will be seen from the drawings two sets of line wipers are provided designated 83, 84 and 85, 86 arranged to establish connection simultaneously with an upper and lower set of contacts each extending to a separate line.

Assuming now that the first two lines in the level selected are busy both testing wipers 6P and 7P will encounter earth which serves to short-circuit the switching relay 2HA and subsequently 2HB to prevent their operation, and when the rotary magnet springs 4rm close at the end of the magnet stroke a circuit will be completed to operate relay 4G on its right-hand winding. Relay 4G in operating at armatures 4g1 completes a locking circuit for its left-hand winding, at armatures 4g2 connects the lower test wiper 7P in circuit with the switching relay 2HB and also the battery connected side of its locking winding at armature 4g3 connects earth to the other side of the switching relay 2HB, and at armature 4g4 opens the energizing circuit to the rotary magnet 4RM. Owing to the fact that the testing wiper 7P is also in engagement with an earthed bank contact relay 2HB is short-circuited against operation, and as the short circuit is also extended to the locking winding of relay 4G the latter is released and again completes the circuit to the rotary magnet which advances the wipers on to the next set of bank contacts. In case the testing wipers 6P and 7P again encounter busy lines, relay 4G will be operated and released in the manner described above to cause the magnet to make a further step, and this action will continue automatically until a free line is encountered, or alternatively the wipers are moved into the 11th rotary position.

Considering first the case in which a free outlet is encountered by the testing wiper 6P, relay 4G will not again be operated owing to the absence of earth on the test contact and as the short circuit is removed from the winding of the switching relay 2HA, this relay will be operated and locked in series with relay 4G. It should be explained that the resistance of relay 2HA is sufficiently high to prevent the operation of relay 4G in this circuit. Upon the operation of the switching relay 2HA at armature 2ha2 direct earth is connected to the test wiper 6P and bank contact to busy the selected switch, at armatures 2ha4 and 2ha5 the speaking conductors 80 and 81 are extended by way of the condensers 1QA and 1QB and wipers 83 and 84 and bank contacts to the switch ahead. The shunt field relay 2D and impedance relay 3I are connected in bridge with the called side of the circuit so as to provide an operating path for the impulse responding relay in the selected switch. Relay 3I is also operated in series with relay 2D and at armature 3i1 a locking circuit is maintained for relay 2BB. Upon the reception of the subsequent trains of impulses relay 4A is again operated in synchronism therewith and at its armature 4a2 repeats the impulses to the switch selected.

Although the circuit to the vertical magnet 4VM is held open during subsequent trains of impulses by rotary off-normal springs 4NR1 the circuit to relay 4C is maintained throughout each subsequent train of impulses and at its armature 4c3 maintains relay 2BB operated, and at armature 4c2 short-circuits relays 2D and 3I so as to provide a more effective impulsing circuit to the switch ahead.

Considering now the condition when all the outlets in the level selected are busy the wipers of the switch will under these circumstances be rotated to the 11th position where cam springs are operated, thereby at springs 4S1 connecting direct earth to the test wiper 6P for the purpose of operating a common overflow meter (not shown) and at the same time short-circuiting the switching relay 2HA against operation. Relay 4G is also operated and locked to terminate the rotary movement. Moreover, at springs 4S2 earthed tone and flash battery provided from the cam assembly shown is connected to the lower speaking conductor so as to inform the calling party that the number dialled is unavailable.

During the earthed tone period relay 3I is released and as this period is considerably in excess of the normal slow releasing time of relay 2BB the latter will release and at armature 2bb3 completes a circuit for the connection of simplex battery to both the junction conductors 80 and 81 to effect the operation of supervising apparatus in case the call is completed via an operator. Relay 4A is released under these conditions and opens the initial energizing circuit to the guard relay 5B but as relay 2BB is also released a circuit is completed by way of the lower winding of relay 5B and cam assembly shown which provides a holding battery during the tone period. During the battery flash period relay 3I is re-operated in a circuit which includes the resting armature 2bb1 and at armatures 3i2, 3i3 and 3i4 restores the conditions of the calling circuit to normal so that relay 4A re-operates to maintain relay 5B. Consequently so long as the calling subscriber maintains the connection relay 3I will be flashed to provide supervision in the controlling operator's cord circuit.

Returning now to the sequence of operations involved in a successful call, when the called party replies battery is reversed over the calling circuit from the final switch in the train, thereby operating the shunt field relay 2D and at the same time maintaining relay 3I. Relay 2D in operating at armature 2d1 opens the locking circuit to relay 1DA which releases and at armatures 1da2 and 1da3 reverses the direction of battery connected to the calling side of the circuit by way of relay 4A, to prepare the controlling switch in the train for the metering operation. Relay 1DA moreover at armature 1da4 short-circuits the line winding of the shunt field relay 2D and connects earth by way of the resistance 3YB to the left-hand winding of relay I and battery by way of the resistance 3YC to the right-hand winding of relay 3I so that this relay may function as a battery feed impedance bridge to the called side of the circuit. The resistances 3YB and 3YC are equal in value and low in resistance so as to preserve the speaking balance. Further at armature 1da5 the original energizing circuit for relay 2BB is closed. At the conclusion of the call when the connection is cleared relay 4A is released, and in turn releases relay 5B which removes earth from the holding conductor to release other relays which may be locked thereto, and at armature 5b2 the circuit to relay 2BB is opened whereupon relay 2BB is opened whereupon relay 2BB releases, since its locking circuit has by this time been opened by the release of relay 3I. At armature 5b4 relay 5B completes a circuit for energizing the release magnet 4ZM by means of which the shaft and wipers are restored to normal. The release magnet is equipped with springs 5zm1 arranged to hold open the circuit to relay 5B and enable the switch to complete its releasing function even though the circuit may be selected by the re-operation of relay 4A before the release is completed.

In case the calling subscriber should hold the connection after the called subscriber has cleared, relay 3I will release and complete a circuit for lighting the called subscriber held supervisory lamp CSH to draw attention to this condition.

Referring now to Figs. 15 and 16 when the final selector shown is seized by a group selector a circuit is completed over conductors 90 and 91 to operate relay 3K in series with relay 5A of the common equipment over the following circuit: battery at the resting armature 3hb4, Fig. 16, armature 3ha4, winding of relay 5A, common conductor 92, armature bs4, conductor 90, calling loop circuit, conductor 91, armature bs5, left-hand winding of relay 3K to earth. Relay 3K in operating at armature 3k1 completes a locking circuit for its right-hand winding by way of the resting armature bs1, release magnet springs 5zm1 and busying test jack springs 2BTJ to earth fed forward over the release trunk conductor 93 from the preceding switch. This forward earth connection also extends to the common conductor 94 and from thence in parallel to all other individual circuits associated with this particular common equipment so as to busy them against selection until the call in progress has been completed. Relay 3K at armature 3k2 short-circuits its initial energizing winding to provide a more effective impulsing circuit to relay 5A, and at armatures 3k3 to 3k10 associates the individual circuit with the common equipment. At armature 5a1, relay 5A in the common equipment completes an operating circuit for relay 6B which at armature 6b1 makes an additional earth connection to the common conductor 94 so as to maintain all other switches marked busy until the common equipment is free, at armature 6b2 prepares a point in the circuit to the driving magnets, at armature 6b3 completes a circuit which will be described later for operating relay 5C over its right hand winding, at armature 6b4 connects earth to a holding lead to which various relays will subsequently lock, at armature 6b5 prepares a circuit for operating relay E and at armature 6b6 prepares the circuit for operating relay S. Relay 5C is operated in a circuit which may be traced from earth at resting armature bs3, Fig. 15, normal rotary springs 5NR2, off-normal springs 5N2, armature 3k6, common conductor 95, armatures 3ha5 and 3hb5, armatures dr5 and 6b3, winding of relay 5C to battery. Upon the operation of relay 5C, a further point is completed at armature 5c1 in the impulsing circuit to the driving magnets and at armature 5c2 the circuit is opened to relay DR until the vertical setting of the wipers is completed. No further circuit changes take place until the reception of the next series of impulses, whereupon relay 5A in the common equipment is operated in synchronism and at each de-energization completes the following circuit for energizing the vertical magnet 5VM in series with the low resistance winding of relay 5C: earth, at armature 5a1, armature 5c1, winding of relay 5C, armatures 6b2 and dr7, conductor 96, armature 3k3, normal rotary springs 5NR1, winding of the vertical magnet 5VM to battery. In this manner the vertical magnet is energized to raise the shaft and wipers to the desired level corresponding to the number of impulses in the series. During the first vertical step the off-normal springs are operated thereby at springs 5N1 completing a point in the circuit to the release magnet 5ZM and at springs 5N2 opens the initial operating circuit to relay 5C. In connection with relays 5C and 6B it should be mentioned that each is equipped with copper slugs to enable them to hold operated continuously throughout the impulsing period. At the conclusion of the train of impulses the wipers will be standing opposite the required level and as relay 5A is now held operated relay 5C will release after a short interval to complete the following circuit to relay DR which effects the necessary transfer to prepare the switch for the rotary movement: earth at armature bs3, normal rotary springs 5NR2, off-normal springs 5N2, armature 3k7, common conductor 97, armatures dr2, 3ha6, 3hb6 and 5c2, winding of relay DR to battery. It will be noticed that further impulsing over the calling circuit will be without effect upon the switch at this stage since the driving circuit previously traced is opened at armature 5c1.

Relay DR in operating locks at its armature dr1, at armature dr2 opens its original energizing circuit, at armature dr3 prepares a circuit to the lower test wiper which is ineffective at this stage, at armature dr4 prepares a circuit to relay RN, at armature dr5 opens a point in the initial operating circuit to relay 5C, at armature dr6 completes an operating circuit for relay E and at armature dr7 completes a point in the driving circuit to the rotary magnet 5RM. Relay E in operating connects an additional earth to its locking circuit at armature e1, at armature e2 opens a point in the circuit to the release magnet RZ which is effective as regards the rotary release only of the wipers, at armature e3 and e4 connects the switch relays 3HA and 3HB in circuit with the test wipers 8P and 9P and at armature e5 completes a circuit to the rotary magnet 5RM by means of which the wipers are advanced into engagement with the first set of bank contacts. As soon as the shaft commences its rotary movement the normal rotary springs are operated thereby at springs 5NR1 preparing a circuit for the operation of relay BS and at springs 5NR2 prepares a circuit for operating relay RN. As will be seen from the drawings two sets of line wipers are provided designated 98, 99 and 100, 101 arranged to establish connection simultaneously with an upper and lower set of contacts respectively each extending to a separate line.

Assuming now that the first two lines in the level selected are busy both test wipers 8P and 9P will encounter earth which prevents the operation of either switching relay 3HA or 3HB; when the rotary magnet springs 5rm close at the end of the magnet stroke earth will be extended over the common conductor 102 to the upper terminal of relay E which is thereupon short circuited and released. Relay E in releasing opens the circuit to the driving magnet 5RM which also releases and when the magnet springs 5rm again open relay E is reoperated to cause the magnet 5RM to advance the wipers into engagement with the next set of bank contacts and this cycle of operations will continue automatically until one of the test wipers encounters a free line. If the group of lines selected exceeds 20 and the first level tests busy on all its outlets, the switch will then take an 11th step thereby operating cam springs 5S1 which extend earth to the common conductor 103 to effect the operation of relay S. Relay S at armature s1 completes a circuit for energizing relay RN to earth over the common conductor 104, relay RN then locks in an alternative circuit formed by way of its armature rn1. It should be explained that the other armatures of relay S are without function at this stage. Relay RN in operating at armature rn2 closes an operating circuit for relay VS, at armature rn3 opens a point in the step-on circuit to the vertical magnet 5VM and at armature rn4 extends earth to the common conductor 105 to energize the rotary release magnet RZ by means of which the shaft and wipers are released as regards their rotary position only. As soon as the shaft commences its return movement the cam springs 5S1 will open and release relay S but relay RN is maintained operated until the rotary home position is reached, whereupon the normal rotary springs 5NR2 will open and relay RN will then release. Relay RN also opens the circuit to relay VS and during the slow releasing period of the latter a circuit is completed for energizing the vertical magnet 5VM to raise the shaft and wipers to the next level, this circuit may be traced from earth at the resting armature s5, armatures rn3 and vs2, common conductor 96, armature 3k3, springs 5NR1, winding of the vertical magnet 5VM to battery. It will also be noticed that relay VS is provided with the armature vs1 arranged to short circuit relay E to prevent this relay operating until the vertical step is completed. Upon the release of relay VS after its slow period the magnet circuit is opened and relay E is again operated over the circuit previously described to interact with the rotary magnet until a free line is encountered.

Considering first the case in which a free outlet is encountered by the upper testing wiper 8P, the switching relay 3HA will be operated in series with the subscriber's cut-off relay (not shown in the drawings) and at armature 3ha1 locks over its left hand winding to earth at armature 6b4.

Upon the operation of the switching relay 3HA the circuit is opened at armature 3ha2 to relay E to terminate the rotary movement, also the locking circuit of relay DR is opened and direct earth is connected to the test wiper 8P and bank contact so as to busy the line selected, at armature 3ha3 a locking circuit is prepared to the ring trip relay F, at armature 3ha4 ringing tone is extended by way of the transformer shown to inform the calling subscriber that the call is proceeding, and at armatures 3ha5 and 3ha6 the following circuit is completed upon the release of relay DR to signal the called subscriber: earth, ringing generator 1GNR, right-hand winding of relay F, armatures s3, f2, 3ha6 and dr2, common conductor 97, armatures 3k7 and ws2, upper line wiper 98 and bank contact, called loop circuit completed by way of the called subscriber's instrument, bank contact and lower line wiper 99, armatures ws 3 and 3k6, common conductor 95, armatures 3ha5 and f3, to ring return battery by way of the resistance 4YA. When the wanted subscriber removes his receiver to answer the call the direct current circuit so produced will permit relay F to operate over its right-hand winding and when the armature f1 which it will be seen is normally short circuiting the left hand winding opens its contacts, the relay will then lock from battery by way of the resistance 4YB in series with the left-hand winding to earth at armature 6b4. Relay F moreover at armature f1 extends earth over the common conductor 96 to effect the operation of relay BS which locks for the remainder of the call to earth on the release trunk conductor 93. Relay F also opens the ringing circuit at armatures f2 and f3 and connects up relay 3D which operates over the circuit formed by way of the called subscriber's instrument and at its armature 3d1 connects battery by way of the resistance 4YA to the lower speaking conductor so as to reverse the direction of current over the calling circuit to prepare the controlling switch in the train for its metering operation.

Returning now to the operation of relay BS, at armature bs2 direct earth is connected to the test wiper 8P since that connected by relay 3HA will shortly be removed, at armature bs3 earth is removed from the lower speaking conductor 99 and at armatures bs4 and bs5 points are prepared in the through speaking connection. Relay 5A in the common equipment is disconnected upon the operation of armatures bs4 and bs5 and in turn opens the circuit to relay 6B which after its slow period opens the holding circuits of relays F and 3HA. Upon the release of relay 6B in the common equipment earth is disconnected from the common conductor 94 to remove the busy condition from other associated switches and at the same time relay 3K is released to dissociate the circuit in question from the common leads and at armature 3k6 completes the through speaking connection. Battery feed for both the calling and called subscribers is supplied from the controlling switch in the train.

In case the lower wiper 9P should encounter the first free outlet the other switching relay 3HB is operated in series with relay WS, the former completing a locking circuit for itself at its armature 3hb1 to earth at armature 6b4 and the latter locking on its other winding to earth on the release trunk conductor 93. It will be noticed from the drawings that the coil of relay WS has been split to avoid complication in the presentation of the circuit. Relay 3HB in operating fulfills the functions already described in connection with the other switching relay 3HA, while relay WS connects up the lower set of wipers.

In case both testing wipers encounter a free outlet at the same instant, both switching relays will be operated but only the switching relay 3HA will be enabled to lock since this relay in operating opens the locking circuit to relay 3HB. Relay WS is of course operated in series with relay 3HB and locks on its other winding so that in cases where two free outlets are encountered simultaneously, the lower set of wipers will always be connected up, and in this manner priority switching is provided. It will be appreciated from the circuit operations described that each group of lines is arranged to occupy one or more complete levels, and if all the lines in a group are busy the switch will be stepped into engagement with the 11th set of contacts following the last line in any group, these contacts are arranged to suspend the rotary release function and to substitute in its place a busy signal to indicate that all the lines are busy.

Considering now the condition when all the lines in the selected group are busy, the wipers of the switch will then be rotated into the 11th position where the contacts are wired as shown in the drawings, so that wiper 8P will encounter resistance battery, and wiper 9P will connect with the overflow meter designated OVM. Under these conditions the switching relay HA is operated and locked to terminate the rotary movement and as the cam springs 5S1 are closed relay S is operated and again operates relay RN, and in turn relay BS. Upon the release of relay E the circuit of relay DR is also opened and during the slow release period of the latter relay earth at armature 3ha2 is connected by way of the armatures s2, dr3, and the common conductor 107, armature 3k10, coil of relay WS, wiper 9P and bank contact to operate the overflow meter OVM which is provided for the purpose of registering all overflow calls. It should be mentioned that the resistance of the meter is sufficiently high to prevent the operation of relay WS under these circumstances. Owing to the operation of relay 3HA the circuit to the release magnet RZ will not be connected up by the release of relay E so that the wipers remain held in the 11th position, and as relay S is also operated a busy signal is transmitted to the calling party by way of the coil of relay 5A. It will be appreciated from the cam assembly shown in the drawings that the busy signal will consist of busy tone and flash battery which are connected up alternately to the winding of relay 5A. During the periods when battery is connected to the coil of relay 5A which are considerably in excess of that represented by the normal slow releasing period of relay 6B battery is also connected by way of the other cam assembly shown to maintain a holding circuit to the lower winding of relay 6B.

Upon the release of the connection earth is removed from the release trunk conductor 93 by the controlling switch in the train and the calling circuit over conductors 90 and 91 is opened. Relay 5A in the common equipment releases and in turn restores relay 6B which removes earth from conductor 94 to restore relay 3K in the individual circuit. Upon the release of relay 3K the individual circuit is dissociated from the common equipment and a circuit is completed to the release magnet 5ZM which energizes to remove the locking detent from the switch shaft which then restores to the normal position. It will also be noted that the release magnet 5ZM is equipped with two sets of springs designated 5zm1 and 5zm2, the former maintaining a guarding earth to the release trunk conductor to busy the switch until the wipers are actually in their home position while at latter hold open the circuit to relay WS.

Referring now to Figs. 17 and 18 it will be seen that the final selector there shown may be taken into use over one of two sets of conductors extending from the preceding switch, the particular set taken into use depending upon the destination of the call. When the switch is taken into use over the upper set of conductors, the upper set of wipers shown will be connected up so as to establish connection with the first hundred group of lines. When the switch is taken into use over the lower set of conductors relay 1WS is operated prior to the setting operation of the switch to connect up the lower set of wipers so that connection may be established in the second hundred group and conveniently under these circumstances an additional facility is brought into operation so that a 2/10 P. B. X. service may be provided on any of the levels in the second hundred group.

Assuming now that the switch is taken into use over the lower set of conductors 110 and 111, the following circuit will be completed for operating relay 1WS in series with relay 6A in the common equipment: earth, left hand winding of relay 1WS, armature 1bs3, conductor 111, calling circuit including the subscriber's instrument, conductor 110, armature 1bs4, common conductor 112, winding of relay 6A in the common equipment, armatures 1h7 and 3bb2 to battery. At the same time earth is fed forward from the controlling switch in the train over the release trunk conductor 113 by way of the busying test jack springs 3BTJ, resting springs 6zm1, resting springs 1bs1, common conductor 114 and from thence in parallel to all other circuits associated with this particular common equipment so as to busy them against selection until the connection is completed. Relay 1WS operates its light armature 1ws1 to complete a locking circuit to earth on the release trunk conductor, at armature 1ws2 a circuit is completed for operating relay 4K over its right hand winding and at armatures 1ws3 to 1ws5 the lower set of wipers are connected up so that connection may be established in the second hundreds group. Earth is also connected to the P. B. X. bank arc 35 to control the automatic rotation of the wipers at a later period. Relay 4K in operating at armature 4k1 completes a locking circuit for itself to the common conductor 114, at armature 4k2 short circuits its initial energizing winding to provide a more effective impulsing circuit more particularly when the switch is taken into use over the upper set of conductors and at armature 4k3 to 4k10 associates the individual circuit with the common equipment.

Returning now to the operation of relay 6A in the common equipment, at its armature 6a1 a circuit is completed to relay 7B which in operating at armature 7b1 connects earth over the common conductor 114 to lock relay 4K and maintain the common equipment busy, at armature 7b2 prepares a point in the impulsing circuit to the driving magnets of the switch taken into use, at armature 7b3 completes a circuit for relay 6C on its right hand winding, and at armature 7b4 connects earth to a holding lead to which various relays in the control equipment are subsequently locked. The circuit for relay 6C may be traced as follows: earth at the normal rotary springs 6NR1, off normal springs 6N3, armature 4k6, common conductor 116, armatures 1h6, 1rn4 and 7b3, winding of relay 6C to battery. Relay 6C in operating at armature 6c1 prepares a further point in the circuit to the driving magnets while the operation of its other armatures is ineffective at this state. No further circuit changes take place until the reception of the first series of impulses over conductors 110 and 111 whereupon relay 6A in the control equipment is operated in synchronism, and upon the first release earth is extended by way of armatures 6a1, 7b2 and 6c1, hs2, low resistance left-hand winding of relay 1C, armatures hs4 and 1e1, common conductor 117, armature 4k3, normal rotary springs 6NR2, winding of vertical magnet 6VM to battery. The magnet therefore energizes to raise the shaft and wipers to the first level when off normal springs are operated, thereby at springs 6N1 short circuiting the left-hand winding of relay 1WS to provide a more effective impulsing circuit, at springs 6N2 the initial energizing circuit of relay 4K is opened and a circuit is prepared for the release magnet 6ZM, while at springs 6N3 the initial energizing circuit of relay 6C is opened and a circuit is prepared for relay 1E. It should be mentioned that the relays 6C and 7B are each equipped with copper slugs surrounding their cores so as to enable them to hold operated continuously throughout the impulsing period. At the conclusion of the train of impulses the wipers will be standing opposite the required level and as relay 6A is now held operated for an extended period relay 6C will release after a short interval and complete the following circuit to relay 1E: earth at the normal rotary springs 6NR1, off normal springs 6N3, armature 4k7, common conductor 118, armature 1hr, 1rn2 and 6c3, winding of relay 1E to battery. Relay 1E in operating at armature 1e1 transfers the impulsing circuit to the rotary magnet 6RM, at armature 1e2 completes a circuit for re-operating relay 6C, at armature 1e3 prepares a locking circuit for itself and at armature 1e4 holds open the ringing circuit until the correct time for the application of ringing current. Upon the reception of the second series of impulses corresponding to the units digit, relay 6A is again operated in synchronism and upon the first release a circuit is completed over the common conductor 119 for the rotary magnet 6RM by means of which the wipers are advanced into engagement with the first set of bank contacts. Relay 1RN is operated in parallel with the circuit for the rotary magnet and at armature 1rn1 disconnects itself from the impulsing circuit and locks until the connection is completed to earth at armature 7b4. Moreover at armature 1rn2 the initial energizing circuit to both relays 6C and 1E is opened, but the former is retained in its operated condition owing to the inclusion of its left hand winding in the impulsing circuit, and in turn maintains a locking circuit for relay 1E. As soon as the shaft commences its rotary movement, rotary off-normal springs are operated thereby at springs 6NR1 opening a further point in the energizing circuit of relays 6C and 1E, and at springs 6NR2 a point is prepared in the circuit to the switching relay 1BS. It will be noticed during rotary stepping that the circuits to the testing wipers 10P and 11P are held open at the armature 6c2.

In case the first line of the group selected is busy, the testing wiper 11P which is connected up at this time will encounter earth and consequently the switching relay 1H will fail to operate when it is connected up upon the release of relay 6C. It should be explained moreover that the switch is provided with a miniature bank arc containing 100 contact points which are wiped over by miniature wipers carried by the main switch shaft. Conveniently two wipers of the trailing type are employed arranged to establish individual connection with adjacent contacts in the same level at the same instant. In the drawings one level only has been shown immediately below the switch wipers and the circuit arrangements are such that all contacts on all levels comprising a single P. B. X. group except the final contact will be connected to earth. Preferably the bank in question comprises a substantially semi-circular earthed plate into which rows of contact pins are screwed to provide the necessary wiper connections. Removal of earth from the bank is therefore effected by unscrewing the actual contact pin from the plate thereby leaving a vacant space.

Returning now to the circuit description it will be remembered that the switch wipers are assumed to be engaging the first set of bank contacts in the selected level which are not free for use, and upon the release of relay 6C the switching relay 1H will fail to operate since earth is connected to both sides of its operating winding, and as the first wiper of the miniature bank is in engagement with the first contact the following circuit may be traced to relay HS: earth at armature 7b1, common conductor 114, armature 4k1, and 1ws2, bank commoning and leading wiper of the P. B. X. arc 125, armature 4k10, common conductor 123, left-hand winding of relay HS, armature 6c4, armature 1h3 and 3bb1 to battery by way of the resistance 5YA. Relay HS operates to bring about automatic stepping of the switch over busy lines in the P. B. X. groups. Relay HS in operating at armature hs1 provides a locking circuit for itself independent of that provided by armature 4c4, at armature hs2 prepares a circuit for reoperating the rotary magnet when relay 1E releases after its slow period, at armature hs3 holds open the circuit to the busy relay 3BB and at armature hs4 connects up a further point in the circuit to the rotary magnet 6RM. Upon the release of relay 1E after its slow period the following circuit may be traced for the rotary magnet: earth at the operated armature 1h4, low resistance right hand winding of relay HS, armature hs2, low resistance left-hand winding of relay 6C, armature hs4, conductor 119, armature 4k4, winding of the rotary magnet 6RM to battery. Relay 6C is re-operated in this circuit and at the conclusion of the magnet stroke when the springs 6rm close, earth is extended over the common conductor 120 to re-operate relay 1E which again locks in its original circuit. Relay 1E in operating opens the circuit to the rotary magnet 6RM and relay 6C, and upon the release of the latter relay and during the slow release period of relay 1E the switching relay 1H is again connected in circuit with the test wiper 11P to test for a free outlet.

In case the second outlet selected is busy relay 1H will again fail to operate and upon the release of relay 1E after its slow period a similar sequence of operations to that already described will be brought about to effect the advancement of the wipers into engagement with the next set of bank contacts and this action will continue automatically until a free outlet is encountered or alternatively the wipers are moved into engagement with the last outlet in the group.

In case all the outlets in the group selected are busy, the wipers will be moved into their final position and in respect of the corresponding contact in the miniature bank arc it should be explained that this is unwired, and therefore the circuit is interrupted to relay HS which releases to terminate the rotary movement and operates the busy relay 3BB over the following circuit: earth at armature 7b4, armature 1e3, armatures 1h4 and hs3 and 1rn3, winding of relay 3BB to battery. Relay 3BB in operating at armature 3bb1 opens a further point in the circuit to relay HS and at armatures 3bb2 and 3bb3 completes a circuit for the transmission of a busy signal to the calling party. It will be seen from the drawings that the busy signal consists of the alternate application of busy tone and flash battery to the winding of relay 6A which is provided from the cam assembly shown. During the periods when earthed tone is connected to the winding of relay 6A which are considerably in excess of that represented by the normal slow releasing period of relay 7B battery is connected by way of the other cam assembly to maintain a holding circuit to the left hand winding of relay 7B.

Considering now the condition when a free line is encountered by the testing wiper 11P, upon the release of relay 6C and during the slow release period of relay 1E relay 1H will be operated from earth at armature 7b4, armature 1e3, lower winding of relay 1H, armature 6c2, common conductor 121 armature 4k8, armature 1ws5, wiper 11P and bank contact to battery by way of the bridge cut off relay in the line circuit (not shown). Relay 1H locks on its upper winding by way of the light armature 1h1 and at armature 1h2 connects direct earth to the test wiper 11P and bank contact to busy the selected circuit against other switches, at armature 1h3 opens a further point in the circuit to relay HS, at armature 1h4 prepares a locking circuit to the ring trip relay 1F, at armatures 1h5 and 1h6 prepares the ringing circuit and at armature 1h7 battery connected ringing tone is extended by way of the winding of relay 6A to the calling subscriber to inform him that the call is proceeding. Following upon the switching of relay 1H relay 1E will release after its slow period to connect up the ringing circuit, which may be traced from the earthed generator 2GNR, right-hand winding of relay 1F, armatures 1e4, 1f2 and 1h5, common conductor 118, armature 4k7, armature 1ws3, line wiper and bank contact, wanted subscriber's instrument circuit, other line wiper and bank contact, armature 1ws4, armature 4k6, common conductor 116, armature 1h6 and 1f3, to battery by way of the ringing return resistance 5YB. In this manner the calling subscriber's bell is rung and when he removes his receiver to answer the call the direct current circuit so produced will permit the operation of relay 1F on its right hand winding, and when the armature 1f which is normally short circuiting the left hand winding is operated the relay is then enabled to lock for the remainder of the call from battery by way of the resistance 5YA. The locking earth to relay 1F is also extended by way of armature 1f1 and the common conductor 117 to operate relay 1BS in the individual circuit which immediately locks by way of its armature 1bs1 to earth connected to the release trunk conductor 113, at armature 1bs2 applies a second earth to the test wiper 11P and bank contact since that connected up by relay 1H will shortly be removed, and at armatures 1bs3, 1bs4 and 1bs5 completes points in the through speaking circuit. Moreover at armatures 1f2 and 1f3 relay 4D is connected up so as to be operated over the called subscriber's instrument circuit, and it will be noticed that this relay is provided with an armature 4d1 arranged to connect battery potential by way of the resistance 5YB over the common conductor 122 to the lower speaking conductor so as to provide a signal to the controlling switch in the train for the setting up of the metering condition.

Upon the operation of armatures 1bs4 and 1bs5 relay 6A in the control equipment is released in turn opening the circuit of relay 7B which releases after its slow period to disconnect relays 4K, 1H and RN. Upon the release of these latter relays the individual circuit is disconnected from the common lead and the common equipment is now freed for use on a further call.

In the case of night service calls when it is usual to have only one line in the P. B. X. group connected through, calling subscribers are instructed to dial a special number other than the first in the group, and since under these circumstances both wipers of the miniature bank arc will encounter the bank commonly before relay 6C releases. Relay HS will then be short circuited to prevent its operation. Consequently in case the line connected with should test busy automatic rotation cannot take place, and upon the release of relay 1E the busy relay 3BB will be operated to extend the busy signal to the calling subscriber.

Considering now the case when the switch is taken into use over the upper set of conductors, relay 1WS will not be operated and the speaking circuit will be extended to the upper set of wipers for establishing connection in the first hundreds group and as this group is not provided with the P. B. X. facility earth is not connected to the P. B. X. bank arc and consequently the switch will test only the line to which the wipers are advanced under the control of the dialled impulses. In case a subscriber should call spare or unallotted number then the circuit operations will be the same as those already described for a successful call so far as the operation of relay 1H, but under these conditions the lower line wiper will meet a battery from the unallotted number equipment from which relay 1F is immediately operated and locked. Since however the circuit to the upper line wiper is not connected, relay 4D will fail to operate and the metering conditions in the controlling switch in the train are therefore suspended. Relay 1F in operating energizes relay 1BS to connect the calling line to the unallotted number of equipment from which a distinctive tone is extended to inform the calling subscriber that the wanted number is unavailable. The common equipment is of course released for further use under these conditions.

Upon the release of the connection at the end of the conversation or alternatively during the busy or dead number condition, earth will be removed from the release trunk conductor 113 by the controlling switch in the train upon the release of all relays in the equipment and the individual circuit concerned, the following circuit may be traced to the release magnet 6ZM, earth at armature 1bs2, armature 4k2, spring 6N2, winding of the release magnet 6ZM to battery. The magnet therefore energizes to remove the locking detent from the switch shaft which then restores to the normal condition. It will be noticed from the drawings that the release magnet is equipped with two sets of springs 6zm1 and 6zm2, the former maintaining a guiding earth to the release trunk conductor to busy the switch until the wipers are actually in their home position, while at springs 6zm2 the energizing circuit is opened to relay 1WS.

Referring now to Figs. 19 and 20 it will be seen that the final selector there shown may be taken into use over one of two sets of conductors extending from the left hand side of the drawings, the particular set taken into use depending upon the destination of the call. When the switch is taken into use over the upper set of conductors the upper set of wipers shown on the right hand side of the drawings will be connected up so as to establish connection with the first hundred group. When the switch is taken into use over the lower set of conductors relay 2WS will be operated prior to the setting operation of the swich to connect up the lower set of wipers, so that connection may be established with the second hundred group.

Assuming now that the switch is taken into use over the lower set of conductors 130 and 131, the following circuit will be completed for operating relay 2WS in series with relay 2A in the common equipment:—earth, winding of relay 2WS, armature 2bs3, conductor 130, calling circuit including subscriber's instrument, conductor 131, armature 2bs5, common conductor 132, winding of relay 72A, armatures 2h6 and 4bb2 to battery. Relay 2WS operates its make-first armature 2ws1 to complete a locking circuit for its right hand winding to earth extended over the release trunk conductor 133 from the controlling switch in the train. Similarly this forward earth will also be extended to the common conductor 134 and from thence in parallel to all circuits associated with this particular common equipment so as to mark them as busy until the common equipment is again freed for use. Moreover, at armature 2ws2 a circuit is completed for operating relay 5K on its right-hand winding and at armatures 2ws3, 2ws4, and 2ws5 the lower set of wipers are connected up so that connection may be established with the second hundreds group. Relay 5K in operating at armature 5k1 prepares a locking circuit for itself over common conductor 134, and at armatures 5k3 to 5k8 inclusive the common equipment shown in Fig. 20 is associated with the final selector switch taken into use.

Returning now to the operation of relay 7A in the common equipment at its armature 7a1 a circuit is completed to relay 8B which in operating at armature 8b1 supplements the earth to the common conductor 134 to lock relay 5K, at armature 8b2 prepares a point in the impulsing circuit to the driving magnets of the switch, at armature 8b3 completes a circuit for pre-operating relay 7C on its right hand winding and at armature 8b4 extends earth to a holding lead to which various relays in the common equipment are subsequently locked. The pre-operating circuit for relay 7C may be traced from earth at the normal rotary springs 7NR1, Fig. 19, off normal springs 7NR3, armature 5k6, common conductor 135 armatures 2h4, 2rn4, 8b3, winding of relay 7C to battery. Relay 7C in operating at armature 7c1 prepares a further point in the circuit to the driving magnets, while the operation of its other armatures are ineffective at this stage. No further circuit changes take place until the reception of the first series of impulses over conductors 130 and 131, whereupon relay 7A in the control equipment is operated in synchronism and upon its first de-energization the following circuit is completed for the vertical magnet: earth, low resistance left hand winding of relay 7C, armatures 8b2, 7c1, and 2e1, common conductor 136, armature 5k3, springs 7NR2, winding of the vertical magnet 7VM to battery. The magnet therefore energizes to raise the shaft and wipers to the first level where off normal springs are operated. At springs 7N1 the left hand winding of relay 2WS is short-circuited to provide a more effective impulsing circuit, at springs 7N2 the initial energizing circuit of relay 5K is opened while a point is closed in the circuit of the release magnet 7ZM, while at springs 7N3 the initial energizing circuit of relay 7C is opened while a point is closed in the circuit of relay 2E. It should be mentioned that the relays 7C and 8B are each equipped with copper slugs surrounding their cores so as to enable them to hold operated continuously through the impulsing period.

At the conclusion of the train of impulses the wipers will be standing opposite the required level and as relay 7A is now held operated for an extended period relay 7C releases after a short interval to complete the following circuit to relay 2E, earth at the normal rotary springs 7NR1, Fig. 19, springs 7N3, armature 5k7, common conductor 137, armatures 2h3, 2rn2, and 7c3, winding of relay 2E to battery. Relay 2E at armature 2e1 transfers the impulsing circuit to the rotary magnet 7RM, at armature 2e2 completes a circuit for re-operating relay 7C, at armature 2e3 prepares a locking circuit for itself and at armature 2e4 opens the ringing circuit via the ring trip relay 2F. Upon the reception of the second series of impulses corresponding to the units digit relay 7A is again operated in synchronism and upon the first de-energization a circuit is completed over the common conductor 138 for the rotary magnet 7RM by means of which the wipers are advanced into engagement with the first set of bank contacts. Relay 2RN is operated in parallel with the rotary magnet and at armature rn1 disconnects itself from the impulsing circuit and locks to earth at armature 8b4. Moreover, at armature 2rn2 the initial energizing circuit to both relays 2E and 7C is opened, but the latter relay is retained operated owing to the inclusion of its left hand winding in the impulsing circuit to the rotary magnet, while relay 2E remains locked in an alternative circuit formed by way of the armatures 7c3, 2e3 and 8b4. As soon as the shaft commences its rotary movement the rotary off normal springs are operated thereby at springs 7NR1 opening a further point in the energizing circuit of relays 7C and 2E, and at springs 7NR2 a point is prepared in the circuit to relay 2BS. It will be noticed during rotary stepping the circuit to the testing wipers 12P and 13P is opened at armature 7c2. At the cessation of the units series of impulses, relay 7A will again be operated for an extended period and upon the release of relay 7C after its slow period the locking period of relay 2E is opened and the following circuit is completed to the switching relay 2H during the slow releasing period of relay 2E, earth at armature 7b4, armature 2e3, lower winding of relay 2H, armature 7c2, common conductor 139, armature 5k8 to the lower test wiper 13P. If the line of the wanted subscriber tests idle the lower test wiper 13P will encounter battery by way of the bridge cut off relay in the called subscriber's line circuit (not shown) and relay 2H will be operated in series therewith. Relay 2H locks on its upper winding by way of its make-first armature 2h1, at armature 2h2 connects a direct earth to the test wiper 13P and bank contact to busy the selected circuit against other switches, at armatures 2h3 and 2h4 prepares the ringing circuit, at armature 2h5 prepares a locking circuit to the ring trip relay 2F, and at armature 2h6 ringing tone is extended by way of the winding of relay 7A to the calling circuit to inform the calling subscriber that the call is proceeding. Following upon the switching of relay 2H relay 2E will release after its slow period to connect up the ringing circuit which may be traced from earthed ringing generators 3GNR, right hand winding of relay 2F, armatures 2e4, 2f2 and 2h3, common conductor 137, armature 5k7, upper line wiper and bank contact, wanted subscriber's instrument circuit, lower line wiper and bank contact, armature 5k6, common conductor 135, armatures 2h4 and 2f3 to ring return battery by way of the resistance 6YB. In this manner the calling subscriber's bell is rung and when he removes his receiver to answer the call the direct current circuit so produced will permit the operation of relay 2F on its right hand winding, and when armature 2f1 is operated, the left hand winding which is normally short circuited will be enabled to function as a locking winding to hold the relay operated. The circuit is also extended from armature 2f1 over the common conductor 136 to operate relay 2BS which immediately locks by way of its armature 2bs1 to earth connected to the release trunk conductor 133. At armature 2bs2 earth is connected to the test wiper 13P and bank contact in order that earth may be extended thereover after the common apparatus is released and at armatures 2bs3, 2bs4 and 2bs5 completes points in the speaking circuit. Moreover at armatures 2f2 and 2f3 relay 5D is connected up so as to be operated over the circuit formed by way of the called subscriber's instrument, and this relay is provided with an armature 5d1 arranged to connect battery potential by way of the resistance 5YB over the common conductor 140 to the speaking conductor 130, so as to provide a signal to the controlling switch in the train for the setting up of the metering condition.

Upon the operation of armatures 2bs4 and 2bs5 relay 7A in the control equipment is released followed by relay 8B after its slow period whereupon relays 5K, 2F, 2H and 2RN are released so that the control equipment is now freed for a further call. It will be appreciated that battery potential will be connected up to the speaking conductor 130 as mentioned above for the release period of relays 7A, 8B and 5K since on the release of relay 5K, battery 6YB will be disconnected from the line at armature 5k5. In case the subscriber should call a spare or unallotted number, the circuit operations will be the same as those already described so far as the operation of relay 2H, but under these conditions the lower line wiper will meet a battery from the unallotted number equipment and relay 2F will be immediately operated and locked. Since however the circuit to the upper line wiper is not completed relay 5D will fail to operate and the metering conditions in the controlling switch in the train are therefore suspended. Relay 2F in operating energizes relay 2BS to connect the calling line to the unalotted number equipment from which a distinctive tone is extended to inform the calling subscriber that the wanted number is unobtainable. The control equipment is of course released under these conditions.

Considering now the condition when the wanted subscriber is already engaged on a previous connection, under these circumstances the test wiper will encounter earth instead of battery and relay 2H will fail to operate. Upon the release of relay 2E after its slow period, the busy relay 4BB is operated and at armature 4bb1 and 4bb2 completes a circuit for the transmission of a busy signal to the calling party. It will be seen from the drawings that the busy signal consists of the alternate application of earthed tone and flash battery to the winding of relay 7A and is provided from the cam assembly shown. During the periods when earthed tone is connected to the winding of relay 7A which are considerably in excess of that represented by the normal slow releasing period of relay 8B battery is connected by way of the other cam assembly to maintain a holding circuit to the upper winding of relay 8B. Upon the release of the connection at the end of the conversation or alternatively during the busy or unallotted number connection, earth will be removed from the release trunk conductor 133 by the controlling switch in the train and upon the release of all relays in the common equipment and the individual circuit concerned, the following circuit may be traced to the release magnet 7ZM, earth at armature 2bs2, armature 5k2, operated off normal springs 7N2, winding of the magnet 7ZM to battery. The magnet therefore energizes to remove the locking detent from the switch shaft which then restores to the normal position. It will be noticed that the release magnet is equipped with two set of springs designated 7zm1 7zm2, the former maintaining a guarding earth to the release trunk conductor 133 to busy the switch until the wipers are actually in their home position, while at springs 7zm2 the energizing circuit of relay 2WS is held open.

We claim:—

1. In a register controller for use in a telephone system to transmit a particular series of routing digits in response to the dialling of a particular exchange code, a switch in said register controller effective to register one of the exchange-code digits, means controlled in accordance with the setting of said switch for determining the routing digits to be sent out, and means effective while the routing digits are being sent out for again operating said switch to exercise a control necessary to the successful sending out of the desired routing digits.

2. In a register controller for use in a telephone system to retransmit a particular series of routing digits in response to the dialling of a particular exchange code, a pair of switches in said register controller responsive respectively to a pair of digits of the exchange code to register such digits, means controlled by the set position of said switches for determining the routing digits to be sent out, and means effective while the routing digits are being sent out for operating said switches to perform separate controlling functions, respectively.

3. In a register controller for use in a telephone system to transmit a particular series of routing digits in response to the dialling of a particular exchange code, a stepping switch in said register controller operable to record one of the exchange-code digits for use in determining the routing digits to be sent out, means effective after the exchange-code digits have been recorded for restoring said stepping switch, and means for thereafter operating said stepping switch to control the values of the several routing digits as they are sent out.

4. In a register controller for use in a telephone system to transmit a particular series of routing digits in response to the dialling of a particular exchange code, a stepping switch in said register controller operable to record one of the exchange-code digits for use in determining the routing digits to be sent out, means effective after the exchange-code digits have been recorded for restoring said stepping switch, and means for operating said switch step by step as the routing digits are sent out, to govern the order of their transmission.

5. In a register controller for use in a multi-office or multi-exchange telephone system to receive the digits dialled by calling subscribers and to retransmit suitable digits to operate the automatic switches, a pair of registers in said register controller effective to record a pair of office or exchange digits, a translating switch and means for setting it to take up a position controlled jointly by said pair of registers and to thereby determine the routing digits to be retransmitted, and means effective while retransmission is taking place for re-operating one of said registers as a counting switch to count the impulses in the several digits and for re-operating the other of said register switches as an output-control switch, or digit distributor.

6. In a register controller for use in telephone systems to register digits in subscribers' telephone numbers and to retransmit controlling impulses to the automatic switches, a switch in said register controller and means for operating it to distribute the incoming digits to the registering apparatus, and means effective when a predetermined number of digits have been received and registered for restoring said switch and for rendering it effective to register the next succeeding digit.

7. In a register controller for use in an automatic telephone system and having facilities for re-routing a call responsive to an alternative code in the event of all paths over the regular route being unavailable, a code switch in said register controller positionable in accordance with the wanted exchange, and means for causing the regular code and the alternative code for controlling the automatic switches to extend connections to a particular exchange to be controlled over adjacent contact sets of said code switch.

8. In a register controller for use in a telephone system to control the positioning of automatic switches pursuant to the setting up of desired telephone connections and having facilities for re-routing a call in the event of all paths over the regular route being unavailable, a code switch in said register controller and means for positioning it according to the wanted exchange to control the sending out of the corresponding wanted code, and means effective when the re-routing facility comes into operation for advancing said code switch to a new position to enable it to control the sending out of the alternative, re-routing code.

9. In a register controller for use in telephone systems and provided with facilities for re-routing a call to a desired exchange in the event of all paths over the regular route to such exchange being unavailable, a code switch in said register controller operable to hunt to find markings in its banks corresponding to the exchange digits dialled by the calling party, and means effective when the re-routing facility comes into operation for advancing the code switch a definite number of steps to a new position from which it controls the sending out of the alternative trains of routing impulses.

10. In a register sender for use in a telephone system to register digits and to retransmit series of impulses to control the setting of automatic switching apparatus, a stepping switch and means for operating it step by step at the speed of the retransmitted impulses to count and bring about the termination of the impulse series, and means for stepping said switch over a predetermined number of contacts between successive trains of impulses and at the speed of impulsing so as to introduce a suitable inter-series pause.

11. In a register sender for use in a telephone system to register and retransmit digits of telephone numbers to automatic switches, means effective in case the register sender is held for more than a predetermined length of time for opening the outgoing impulsing circuit for a sufficient time to insure the release of any switches which may have been operated from the register sender, a stepping switch in said register sender normally employed for controlling the number of impulses sent out, and means effective when the said release of a partially-operated train of switches is to be brought about for operating said stepping switch through a predetermined number of steps to time the releasing operation.

12. In a register sender for use in a telephone system, a translator switch in a register sender normally responsive to the dialling of a plurality of digits by a calling subscriber to take up a position determined by a plurality of such digits to predetermine the retransmission of a particular impulse code, and means responsive to the dialling of a single digit of predetermined value for causing said translator switch to be set into a corresponding position to predetermine a code assigned to the said single digit.

13. In a telephone exchange system employing register senders arranged to control a group of automatic switches to extend a call to another exchange over alternative routes, controlling apparatus common to said group of automatic switches, and means controlled by way of any one of said automatic switches from said common controlling apparatus for causing the register sender to make a choice between the two routes.

14. In a telephone system, a group of group-selector switches, controlling apparatus common to all of said selector switches and arranged to control any of said switches independent of the speaking route, and means in the said common apparatus responsive to all lines in a selected group being busy for transmitting back toward the calling end of the connection a signal having a characteristic dependent upon the group of lines which has been selected by the associated group selector.

15. In a telephone system employing register controllers for controlling automatic switches, means in a register controller for releasing a partially set-up connection when an all-trunks-busy condition is encountered at a group of selectors, an apparatus unit common to said group of selectors and effective to control any selector in such group independent of the speaking route, and means in said common unit for transmitting an all-trunks-busy signal back to the register controller to cause the register controller to release the partially set-up connection.

16. In an automatic telephone system, a group of group-selector switches, an apparatus unit common to said group of selector switches and adapted to control any one of said switches independent of the speaking route, a register controller effective to control the setting up of connections through said selectors, means in said common unit to transmit a characteristic signal to the register controller responsive to all the outlets in a selected group being busy, and means in the register controller responsive to such signals for re-routing the call.

17. In a telephone system wherein the connections are set up by way of automatic switches under the control of register senders, means in one of the automatic switches for closing the holding bridge across the talking conductors to the succeeding switches in one case and for closing instead a bridge across the talking conductors including a supply of transmitter current for the called line in another case, and means controlled from the register controller depending upon the destination of the call for determining which of said two bridges are closed.

18. In a telephone system employing register controllers in association with the first numerical switches to respond to trains of impulses transmitted by a calling party and to effect a suitable translation between the received impulses and those transmitted to the automatic switches, and means in a first numerical switch responsive to the first train of impulses transmitted by a register controller for closing a dry holding bridge or a transmitter-current-supply bridge to the succeeding switches, depending upon the value of a received impulse series.

19. In an automatic telephone system wherein meters are supplied for the subscribers' lines and wherein the connections which may be set up have different values, corresponding to different numbers of meter operations, a group of meter-controlling apparatus-units common to a group of trunk lines over which connections are set up, means effective when one of said trunk lines is taken into use for rendering one of said units temporarily individual to such trunk line, means for conditioning such unit in accordance with the value of the connection set up by way of such trunk line, as determined by the number called, and means effective after the connection has been set up for operating the meter of the calling line a number of times depending upon the value of the connection and for restoring the common unit to common use, while the established talking connection remains intact.

20. In a measured-service automatic telephone system employing register senders for controlling automatic switches to set up desired connections, said register senders being associated with the first numerical switches, link circuits interposed between said first numerical switches and said register senders and common to both, means effective when a first numerical switch is taken for use for seizing a register controller by way of one of said common link circuits, and means in the common link circuit and controlled from the register controller in accordance with the destination of the call for operating the meter of the calling subscriber an appropriate number of times when the called subscriber replies.

21. In an automatic telephone system using register senders and employing an order of numerical switches for selecting the register senders, means effective after a connection has been set up for freeing the register sender, while leaving the numerical switch operated which selected it, and means effective when the called subscriber responds and controlled from said numerical switch for operating the calling subscriber's meter and for thereupon releasing the numerical switch.

22. In a telephone system employing register controllers arranged to control a group of group-selector switches over branch connections, and a polarized signal device located in the branch connection and responsive to a reversal of current flow when the called subscriber replies.

23. In a telephone system, a group of final-selector switches, or connector switches, a common apparatus unit associated with said group and arranged to control any switch of the group, and means effective when the called subscriber responds, and controlled from the common apparatus unit, for completing a metallic through connection through the speaking leads of the final selector.

24. In an automatic telephone system, a group of numerical switches any one of which may form a link in an established telephone connection, an appartus unit common to all said numerical switches, a connecting relay in each of said numerical switches for connecting the corresponding numerical switch to the common apparatus unit, and means effective after one of said numerical switches has been operated under the control of the common apparatus unit for operating the connecting relay of said switch to disconnect the common apparatus unit and to complete the talking circuit through the switch.

25. In a telephone system, a two-directional switch having contacts operated by the switch mechanism upon the initiation of the primary and secondary movements, respectively, said contacts being effective to control respectively the operation of relays controlling the corresponding switch magnets, and means for rendering said relays common to a group of such switches.

26. In a telephone system, a two-directional automatic switch having contacts operated by the switch mechanism upon the initiation of the secondary movement of the switch, apparatus common to said switch and to other similar switches, a lead extending from said switch to said common apparatus, said contacts in the switch being effective to control the operation of the common apparatus over said lead, and means in the common apparatus subsequently effective to control a further extension of the call over said lead.

27. In a telephone system, an automatic numerical switch associated with apparatus common to a group of such switches, a relay in said switch controlling the speaking connection, a lead connecting said switch and common apparatus, and means in the common apparatus unit for controlling a magnet of the switch and said relay over said lead.

28. An automatic telephone system, a two-directional automatic switch, an apparatus unit common to said switch and to other similar switches, and means effective when any one of said switches is being operated and controlled from the common apparatus unit for causing said switch to traverse its levels of contacts successively until an idle line is found.

29. In an automatic telephone system, a two-directional automatic switch arranged to hunt over a group of contacts, an apparatus unit common to said switch and to other similar switches, and means controlled from said apparatus unit and effective when all of the contacts in a selected group have been tested and found to be busy for causing said switch to perform a second hunting operation.

30. In an automatic telephone system, a group of final selectors, an apparatus unit common to all the selectors of said group, each of said selectors having two sets of wipers, and means controlled from the common apparatus units for causing any one of said switches to operate to test groups of contacts successively and for causing the testing operation to be performed with both wiper sets simultaneously.

31. In an automatic telephone system, a trunk line divided into two telephonically-united sections, a relay in the second section operable to project ringing current back over the first section, means including automatic switching apparatus controlled from a calling line to set up a connection from such line to a called line by way of said trunk line, and means at the called line for operating said relay at will to signal the subscriber on the calling line.

FRANCIS TATLOCK BELAS.
CHARLES EDMUND BEALE.
REGINALD TAYLOR.
GEORGE THOMAS BAKER.
CHARLES GILLINGS.